US011702948B2

(12) United States Patent
Hock et al.

(10) Patent No.: US 11,702,948 B2
(45) Date of Patent: Jul. 18, 2023

(54) CMC SHROUD SEGMENT WITH INTERLOCKING MECHANICAL JOINTS AND FABRICATION

(71) Applicant: General Electric Company, Schenectady, NY (US)

(72) Inventors: Mackenzie Christopher Hock, Mason, OH (US); Daniel Gene Dunn, Guilderland, NY (US); Douglas Glenn Decesare, Queensbury, NY (US); Douglas Melton Carper, Trenton, OH (US); Steven Robert Hayashi, Niskayuna, NY (US); Nathan Carl Sizemore, Hamilton, OH (US); Nolan Leander Cousineau, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/516,013

(22) Filed: Nov. 1, 2021

(65) Prior Publication Data
US 2022/0056809 A1 Feb. 24, 2022

Related U.S. Application Data

(62) Division of application No. 15/920,741, filed on Mar. 14, 2018, now abandoned.

(51) Int. Cl.
  *F01D 11/08* (2006.01)
  *F01D 25/00* (2006.01)
  (Continued)

(52) U.S. Cl.
  CPC ............ *F01D 11/08* (2013.01); *F01D 25/005* (2013.01); *F01D 5/225* (2013.01); *F01D 9/04* (2013.01);
  (Continued)

(58) Field of Classification Search
  CPC . F01D 9/04; F01D 9/041; F01D 9/042; F01D 5/225; F01D 25/005; F01D 25/246;
  (Continued)

(56) References Cited

U.S. PATENT DOCUMENTS 1,884,252 A    10/1932   Robinson
3,410,441 A *  11/1968   Rhyne ................. A47B 88/941
                                                312/263

(Continued)

FOREIGN PATENT DOCUMENTS

DE    102016207863 A1    11/2017

OTHER PUBLICATIONS

Brun, Formation of Tough Composite Joints, Journal of the American Ceramic Society, vol. 81, No. 12, Dec. 1998, pp. 3307-3312.
(Continued)

*Primary Examiner* — J. Todd Newton
*Assistant Examiner* — Behnoush Haghighian
(74) *Attorney, Agent, or Firm* — Dority & Manning, P.A.

(57) ABSTRACT

A shroud segment including a forward radial wall, an aft radial wall and at least one interlocking subcomponent. The forward radial wall, an aft radial wall and the at least one interlocking subcomponent are each formed of a ceramic matrix composite (CMC) including reinforcing fibers embedded in a matrix. The shroud segment further including an interlocking mechanical joint joining each of the forward radial wall and the aft radial wall to the at least one interlocking subcomponent. Methods are also provided for joining the forward radial wall and the aft radial wall to the at least one interlocking subcomponent using an interlocking mechanical joint.

16 Claims, 18 Drawing Sheets

(51) Int. Cl.
| | |
|---|---|
| F01D 9/04 | (2006.01) |
| F01D 11/00 | (2006.01) |
| F01D 5/22 | (2006.01) |
| F01D 25/24 | (2006.01) |

(52) U.S. Cl.
CPC ............ *F01D 9/041* (2013.01); *F01D 11/005* (2013.01); *F01D 25/246* (2013.01); *F05D 2220/32* (2013.01); *F05D 2230/60* (2013.01); *F05D 2240/11* (2013.01); *F05D 2300/6033* (2013.01)

(58) Field of Classification Search
CPC ...... F01D 25/162; F01D 11/08; F01D 11/005; F01D 11/006; F01D 11/008; F05D 2240/11; F05B 2240/11; F05B 2230/60; F05B 2280/6003; F04D 29/1664; F04D 29/023; F04D 29/444
See application file for complete search history.

(56) References Cited

U.S. PATENT DOCUMENTS

| | | | |
|---|---|---|---|
| 4,083,464 A * | 4/1978 | Burnett .............. | B65D 11/1873 446/124 |
| 4,492,153 A * | 1/1985 | Grabowski ........ | B65D 11/1873 426/8 |
| 5,506,018 A | 4/1996 | Jacob et al. | |
| 6,142,731 A * | 11/2000 | Dewis ..................... | F01D 11/18 415/173.1 |
| 6,439,844 B1 | 8/2002 | Turnquist et al. | |
| 6,648,597 B1 | 11/2003 | Widrig et al. | |
| 6,758,653 B2 * | 7/2004 | Morrison ................ | F01D 25/12 415/174.4 |
| 6,808,363 B2 | 10/2004 | Darkins, Jr. et al. | |
| 6,884,026 B2 * | 4/2005 | Glynn ........................ | F02C 7/20 415/113 |
| 6,893,214 B2 | 5/2005 | Alford et al. | |
| 7,569,625 B2 * | 8/2009 | Keller ...................... | C08J 3/241 528/18 |
| 7,635,515 B1 * | 12/2009 | Sherman .................. | C23C 4/12 428/698 |
| 7,723,405 B2 * | 5/2010 | Braun ...................... | C09D 7/65 528/38 |
| 7,753,643 B2 * | 7/2010 | Gonzalez .................. | F01D 9/04 415/174.4 |
| 7,887,249 B2 * | 2/2011 | Schmitz .................... | B64C 9/02 52/631 |
| 7,963,038 B2 | 6/2011 | Schmitz | |
| 8,061,977 B2 * | 11/2011 | Keller .................... | F01D 21/045 415/173.1 |
| 8,235,670 B2 * | 8/2012 | Morrison ................ | F01D 5/147 29/889.72 |
| 8,297,931 B2 * | 10/2012 | Read .................... | F01D 11/008 416/500 |
| 8,616,801 B2 * | 12/2013 | Morrison .............. | C04B 37/001 403/231 |
| 8,961,059 B2 | 2/2015 | Reeves et al. | |
| 8,992,167 B2 | 3/2015 | Casavant et al. | |
| 9,039,358 B2 * | 5/2015 | Tholen .................... | F01D 11/08 415/173.3 |
| 9,132,619 B2 | 9/2015 | Khalifa et al. | |
| 9,145,792 B2 * | 9/2015 | Hunt ........................ | F01D 5/005 |
| 9,151,166 B2 | 10/2015 | Uskert | |
| 9,206,702 B2 * | 12/2015 | Hunt ........................ | F01D 11/08 |
| 9,291,060 B2 | 3/2016 | Lazur | |
| 9,376,916 B2 * | 6/2016 | McCaffrey .............. | F01D 5/147 |
| 9,458,726 B2 * | 10/2016 | Lamusga ................ | F01D 5/147 |
| 9,587,517 B2 * | 3/2017 | Vetters .................... | F01D 11/18 |
| 9,759,079 B2 * | 9/2017 | Sippel .................... | F01D 25/265 |
| 9,784,116 B2 | 10/2017 | Hafner et al. | |
| 9,945,256 B2 * | 4/2018 | Freeman ................ | F01D 25/246 |
| 9,970,310 B2 * | 5/2018 | McCaffrey ............ | F01D 25/005 |
| 10,030,541 B2 * | 7/2018 | Vetters .................. | F01D 25/246 |
| 10,132,194 B2 * | 11/2018 | Vetters .................... | F01D 25/12 |
| 10,132,197 B2 * | 11/2018 | Heitman .................. | F01D 9/04 |
| 10,196,919 B2 * | 2/2019 | O'Leary .................. | F01D 25/12 |
| 2004/0062639 A1 * | 4/2004 | Glynn .................... | F01D 11/08 415/173.1 |
| 2004/0101358 A1 * | 5/2004 | Odorico .................. | F16B 12/52 403/403 |
| 2005/0254942 A1 | 11/2005 | Morrison et al. | |
| 2006/0249912 A1 * | 11/2006 | Wilson .................. | F16J 15/442 277/409 |
| 2007/0289246 A1 * | 12/2007 | Schmitz .................. | E04C 2/296 52/592.1 |
| 2007/0289248 A1 * | 12/2007 | Schmitz .................. | E04C 2/296 52/631 |
| 2008/0025838 A1 * | 1/2008 | Marini .................. | F01D 25/246 415/173.4 |
| 2009/0010755 A1 * | 1/2009 | Keller .................... | F01D 21/045 415/197 |
| 2009/0324393 A1 * | 12/2009 | Gonzalez ................ | F23R 3/007 415/170.1 |
| 2010/0322760 A1 * | 12/2010 | Morrison .............. | F04D 29/023 415/115 |
| 2013/0323073 A1 * | 12/2013 | McCaffrey .............. | F01D 5/147 29/889.7 |
| 2014/0271147 A1 * | 9/2014 | Uskert .................... | F01D 11/22 415/173.2 |
| 2015/0003958 A1 * | 1/2015 | Uskert .................. | F01D 25/246 415/134 |
| 2015/0044049 A1 * | 2/2015 | Lamusga ................ | F01D 5/225 416/182 |
| 2015/0345296 A1 | 12/2015 | Davidson et al. | |
| 2015/0345307 A1 | 12/2015 | Davidson et al. | |
| 2015/0345314 A1 | 12/2015 | Davidson et al. | |
| 2016/0177787 A1 | 6/2016 | Benson | |
| 2016/0249912 A1 | 9/2016 | Fischvogt | |
| 2016/0325368 A1 | 11/2016 | Landwehr et al. | |
| 2016/0376893 A1 * | 12/2016 | Hardwicke ............ | B23P 6/005 156/249 |
| 2017/0002674 A1 * | 1/2017 | Vetters .................. | F01D 25/246 |
| 2017/0211403 A1 * | 7/2017 | McCaffrey .............. | F01D 5/186 |
| 2018/0291769 A1 * | 10/2018 | Vetters .................. | F01D 25/246 |
| 2018/0340440 A1 * | 11/2018 | Freeman ................ | F01D 5/284 |
| 2019/0145270 A1 | 5/2019 | Dunn et al. | |
| 2019/0271234 A1 * | 9/2019 | Campbell ............... | F01D 5/284 |
| 2020/0261887 A1 * | 8/2020 | Wirth .................... | B01J 20/3236 |
| 2020/0290174 A1 * | 9/2020 | Schillo-Armstrong ..................... | C09K 3/1427 |

OTHER PUBLICATIONS

Corman et al., Melt Infiltrated Ceramic Composites (HiperComp) for Gas Turbine Engine Applications, Continuous Fiber Ceramic Composites Program Phase II Final Report for the Period May 1994-Sep. 2005, Chapter 3.3 Composite Joining, pp. 97-115.

* cited by examiner

CMC SHROUD SEGMENT WITH INTERLOCKING MECHANICAL JOINTS AND FABRICATION

CROSS-REFERENCE TO RELATED APPLICATIONS

This application is a divisional of U.S. patent application Ser. No. 15/920,741 filed Mar. 14, 2018. The contents of that application is incorporated herein by reference in their entirety as if set forth verbatim.

BACKGROUND

The subject matter disclosed herein relates to ceramic matrix composite (CMC) subcomponents and the joining of such subcomponents. More particularly, this invention is directed to a CMC shroud segment and method of forming the CMC shroud segment from multiple subcomponents utilizing interlocking mechanical joints.

Gas turbine engines feature several components. Air enters the engine and passes through a compressor. The compressed air is routed through one or more combustors. Within a combustor are one or more nozzles that serve to introduce fuel into a stream of air passing through the combustor. The resulting fuel-air mixture is ignited in the combustor by igniters to generate hot, pressurized combustion gases in the range of about 1100° C. to 2000° C. This high energy airflow exiting the combustor is redirected by the first stage turbine nozzle to downstream high and low pressure turbine stages. The turbine section of the gas turbine engine contains a rotor shaft and one or more turbine stages, each having a turbine disk (or rotor) mounted or otherwise carried by the shaft and turbine blades mounted to and radially extending from the periphery of the disk. A turbine assembly typically generates rotating shaft power by expanding the high energy airflow produced by combustion of fuel-air mixture. Gas turbine buckets or blades generally have an airfoil shape designed to convert the thermal and kinetic energy of the flow path gases into mechanical rotation of the rotor. In these stages, the expanded hot gases exert forces upon turbine blades, thus providing additional rotational energy to, for example, drive a power-producing generator.

In advanced gas path (AGP) heat transfer design for gas turbine engines, the high temperature capability of CMCs make it an attractive material from which to fabricate arcuate components such as turbine blades, nozzles and shrouds. Within a turbine engine, a shroud is a ring of material surrounding the rotating blades and is typically comprised of a plurality of shroud segments.

A number of techniques have been used to manufacture turbine engine components such as the turbine blades, nozzles or shrouds using CMC. CMC materials generally comprise a ceramic fiber reinforcement material embedded in a ceramic matrix material. The reinforcement material serves as the load-bearing constituent of the CMC in the event of a matrix crack; the ceramic matrix protects the reinforcement material, maintains the orientation of its fiber, and carries load in the absence of matrix cracks. Of particular interest to high-temperature applications, such as in a gas turbine engine, are silicon-based composites. Silicon carbide (SiC)-based CMC materials have been proposed as materials for certain components of gas turbine engines, such as the turbine blades, vanes, combustor liners, and shrouds. SiC fibers have been used as a reinforcement material for a variety of ceramic matrix materials, including SiC, C, and $Al_2O_3$. Various methods are known for fabricating SiC-based CMC components, including Silicomp, melt infiltration (MI), chemical vapor infiltration (CVI), polymer infiltration and pyrolysis (PIP). In addition to non-oxide based CMCs such as SiC, there are oxide based CMCs. Though these fabrication techniques significantly differ from each other, each involves the fabrication and densification of a preform to produce a part through a process that includes the application of heat at various processing stages. In many instances, fabrication of complex composite components, such as with fabrication of CMC gas turbine shrouds with radially oriented walls and circumferentially curved flowpaths, may require complex tooling and may involve forming fibers over small radii. For example, this challenge occurs with the integration of shroud walls to the flowpath, both of which lead to challenges in manufacturability. As a result, two or more simpler shaped components may be manufactured and joined into a more complex shape. This approach reduces manufacturing complexities.

Thus, of particular interest in the field of CMCs is the joining of one CMC subcomponent, or preform, to another CMC or ceramic subcomponent to form a complete component structure. For instance, the joining of one CMC subcomponent to another may arise when the shape complexity of an overall complete structure may be too complex to manufacture as a single part, such as with the previously mentioned gas turbine shroud, and particularly the shroud segments. Another instance where joining of one CMC subcomponent to another may arise is when a large complete structure is difficult to lay-up as a single part, and multiple subcomponents are manufactured and joined to form the large complete structure. Current procedures for bonding CMC subcomponents include, but are not limited to, diffusion bonding, reaction forming, melt infiltration, brazing, adhesives, or the like. Of particular concern in these CMC component structures that are formed of conjoined subcomponents is the separation or failure, of the joint that is formed during the joining procedure when under the influence of applied loads.

Thus, an improved interlocking mechanical joint and method of joining one CMC subcomponent of a gas turbine shroud segment to another ceramic monolithic subcomponent or CMC subcomponent to form a complete gas turbine shroud segment is desired. The resulting interlocking mechanical joint provides strength and toughness to the gas turbine shroud structure.

BRIEF DESCRIPTION

Various embodiments of the disclosure include a ceramic composite material gas turbine shroud component and fabrication using interlocking mechanical joints. In accordance with one exemplary embodiment, disclosed is a shroud segment including a forward radial wall, an aft radial wall, at least one interlocking subcomponent and an interlocking mechanical joint. The forward radial wall is comprised of a ceramic matrix composite (CMC) including reinforcing fibers embedded in a matrix. The aft radial wall is comprised of a ceramic matrix composite (CMC) including reinforcing fibers embedded in a matrix. The at least one interlocking subcomponent is comprised of a ceramic matrix composite (CMC) including reinforcing fibers embedded in a matrix. The interlocking mechanical joint joins each of the forward radial wall and the aft radial wall to the at least one interlocking subcomponent to form the shroud segment.

In accordance with another exemplary embodiment, disclosed is a shroud segment for a gas turbine. The shroud segment includes a forward radial wall, an aft radial wall, at least one interlocking subcomponent and an interlocking mechanical joint. The forward radial wall is comprised of a ceramic matrix composite (CMC) including a plurality of reinforcing fibers embedded in a matrix. The aft radial wall is comprised of a ceramic matrix composite (CMC) including a plurality of reinforcing fibers embedded in a matrix. The at least one interlocking subcomponent is comprised of a ceramic matrix composite (CMC) including reinforcing fibers embedded in a matrix. The interlocking mechanical joint joins each of the first radial wall and the aft radial wall to the at least one interlocking subcomponent wherein at least one or more of the forward radial wall, the aft radial wall, and the at least one interlocking subcomponent are bonded to at least another one of the forward radial wall, the aft radial wall, and the at least one interlocking subcomponent.

In accordance with yet another exemplary embodiment, disclosed is a method of forming a ceramic matrix composite (CMC). The method including providing a forward radial wall, providing an aft radial wall, providing at least one interlocking subcomponent and mechanically joining each of the forward radial wall and the aft radial wall to the at least one interlocking subcomponent at an interlocking mechanical joint and form the shroud segment. The forward radial wall is comprised of a ceramic matrix composite (CMC) including reinforcing fibers embedded in a matrix. The aft radial wall is comprised of a ceramic matrix composite (CMC) including reinforcing fibers embedded in a matrix. The at least one interlocking subcomponent is comprised of a ceramic matrix composite (CMC) including reinforcing fibers embedded in a matrix.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
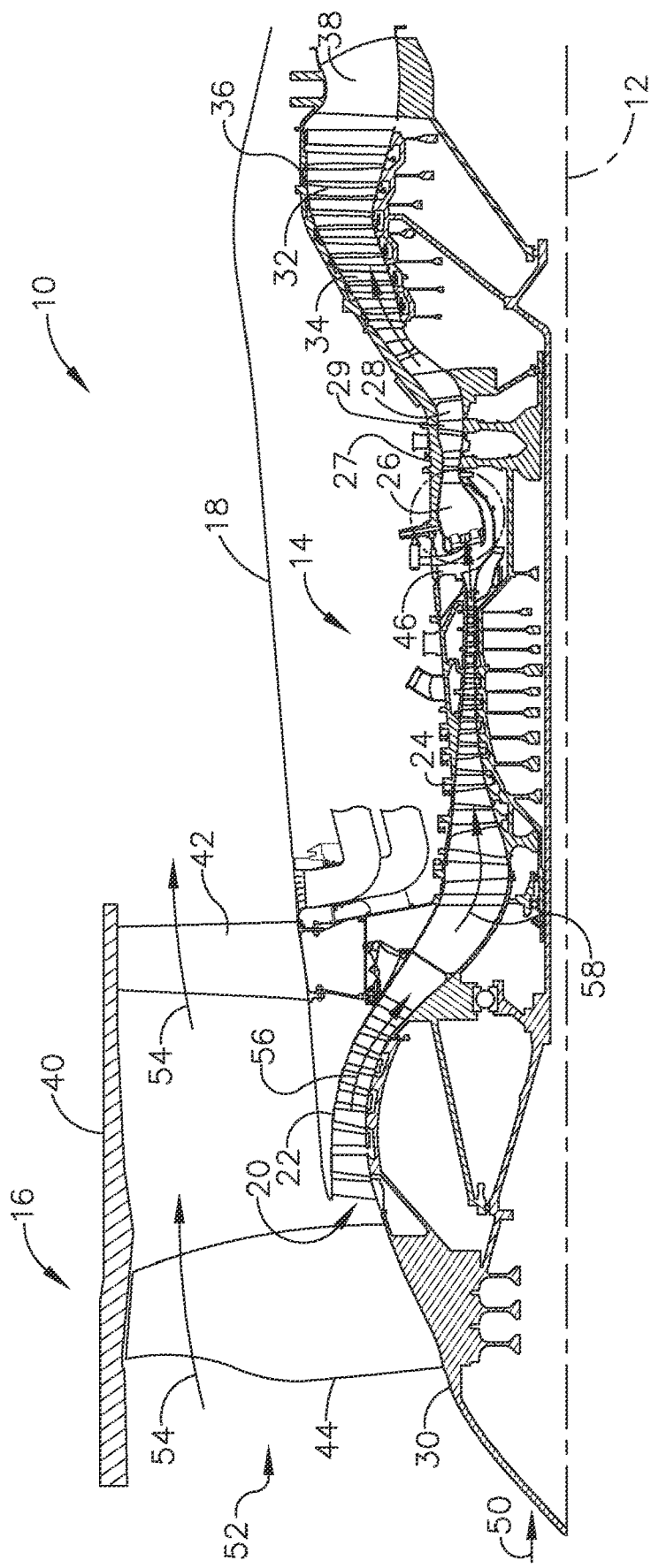
FIG. 1 is a cross sectional illustration of an aviation gas turbine engine, in accordance with one or more embodiments shown or described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, is applied to modify any quantitative representation that could permissibly vary without resulting in a change in the basic function to which it is related. Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by such term is not to be limited to the precise value specified. In at least some instances, the approximating language may correspond to the precision of an instrument for measuring the value. Here and throughout the specification and claims, range limitations are combined and interchanged. Such ranges are identified and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, ceramic matrix composite or "CMCs" refers to composites comprising a ceramic matrix reinforced by ceramic fibers. Some examples of CMCs acceptable for use herein can include, but are not limited to, materials having a matrix and reinforcing fibers comprising oxides, carbides, nitrides, oxycarbides, oxynitrides and mixtures thereof. Examples of non-oxide materials include, but are not limited to, CMCs with a silicon carbide matrix and silicon carbide fiber (when made by silicon melt infiltration, this matrix will contain residual free silicon); silicon carbide/silicon matrix mixture and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Accordingly, as used herein, the term "ceramic matrix composite" includes, but is not limited to, carbon-fiber-reinforced carbon (C/C), carbon-fiber-reinforced silicon carbide (C/SiC), and silicon-carbide-fiber-reinforced silicon carbide (SiC/SiC). In one embodiment, the ceramic matrix composite material has increased elongation, fracture toughness, thermal shock, and anisotropic properties as compared to a (non-reinforced) monolithic ceramic structure.

There are several methods that can be used to fabricate SiC-SiC CMCs. In one approach, the matrix is partially formed or densified through melt infiltration (MI) of molten silicon or silicon containing alloy into a CMC preform. In another approach, the matrix is at least partially formed through chemical vapor infiltration (CVI) of silicon carbide into a CMC preform. In a third approach, the matrix is at least partially formed by pyrolyzing a silicon carbide yielding pre-ceramic polymer. This method is often referred to as polymer infiltration and pyrolysis (PIP). Combinations of the above three techniques can also be used.

In one example of the MI CMC process, a boron-nitride based coating system is deposited on SiC fiber. The coated fiber is then impregnated with matrix precursor material in order to form prepreg tapes. One method of fabricating the tapes is filament winding. The fiber is drawn through a bath of matrix precursor slurry and the impregnated fiber wound on a drum. The matrix precursor may contain silicon carbide and or carbon particulates as well as organic materials. The impregnated fiber is then cut along the axis of the drum and is removed from the drum to yield a flat prepreg tape where the fibers are nominally running in the same direction. The resulting material is a unidirectional prepreg tape. The prepreg tapes can also be made using continuous prepregging machines or by other means. The tape can then be cut into shapes, layed up, and laminated to produce a preform. The preform is pyrolyzed, or burned out, in order to char any organic material from the matrix precursor and to create porosity. Molten silicon is then infiltrated into the porous preform, where it can react with carbon to form silicon carbide. Ideally, excess free silicon fills any remaining porosity and a dense composite is obtained. The matrix produced in this manner typically contains residual free silicon.

The prepreg MI process generates a material with a two-dimensional fiber architecture by stacking together multiple one-dimensional prepreg plies where the orientation of the fibers is varied between plies. Plies are often identified based on the orientation of the continuous fibers. A zero degree orientation is established, and other plies are designed based on the angle of their fibers with respect to the zero degree direction. Plies in which the fibers run perpendicular to the zero direction are known as 90 degree plies, cross plies, or transverse plies.

The MI approach can also be used with two-dimensional or three-dimensional woven architectures. An example of this approach would be the slurry-cast process, where the fiber is first woven into a three-dimensional preform or into a two-dimensional cloth. In the case of the cloth, layers of cloth are cut to shape and stacked up to create a preform. A chemical vapor infiltration (CVI) technique is used to deposit the interfacial coatings (typically boron nitride based or carbon based) onto the fibers. CVI can also be used to deposit a layer of silicon carbide matrix. The remaining portion of the matrix is formed by casting a matrix precursor slurry into the preform, and then infiltrating with molten silicon.

An alternative to the MI approach is to use the CVI technique to densify the Silicon Carbide matrix in one-dimensional, two-dimensional or three-dimensional architectures. Similarly, PIP can be used to densify the matrix of the composite. CVI and PIP generated matrices can be produced without excess free silicon. Combinations of MI, CVI, and PIP can also be used to densify the matrix.

The joints described herein can be used to join various CMC materials, such as, but not limited to, Oxide-Oxide CMCs or SiC-SiC CMCs, or to join CMCs to monolithic materials. The joints can join subcomponents that are all MI based, that are all CVI based, that are all PIP based, or that are combinations thereof. In the case of interlocking mechanical joints, there may not be direct bonding of the subcomponents together, or the subcomponents may be bonded by silicon, silicon carbide, a combination thereof, or other suitable material. The bonding material may be deposited as a matrix precursor material that is subsequently densified by MI, CVI, or PIP. Alternatively, the bonding material may be produced by MI, CVI, or PIP without the use of matrix precursor in the joint. Furthermore, the joints described herein may be formed at any appropriate stage in CMC processing. That is, the subcomponents may be comprised of green prepreg, laminated preforms, pyrolyzed preforms, fully densified preforms, or combinations thereof.

Referring now to the drawings wherein like numerals correspond to like elements throughout, attention is directed initially to FIG. 1 which depicts in diagrammatic form an exemplary gas turbine engine 10 utilized with aircraft having a longitudinal or axial centerline axis 12 therethrough for reference purposes. It should be understood that the principles described herein are equally applicable to turbofan, turbojet and turboshaft engines, as well as turbine engines used for other vehicles or in stationary applications. Furthermore, while a turbine shroud is used as an example, the principles of the present invention are applicable to any low-ductility flowpath component which is at least partially exposed to a primary combustion gas flowpath of a gas turbine engine and formed of a ceramic matrix composite (CMC) material.

Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft, and then to a second (low pressure) turbine 32 for driving booster compressor 22 and fan section 16 through a second (low pressure) drive shaft that is coaxial with first drive shaft. The turbines 28, 32 include a stationary nozzle and a rotor disk downstream of the nozzle that rotates about the centerline axis 12 of the engine 10 and carries an array of airfoil-shaped turbine blades 34. Shrouds 29, 36 comprising a plurality of arcuate shroud segments is arranged so as to encircle and closely surround the turbine blades 27, 34 and thereby define the outer radial flowpath boundary for the hot gas stream flowing through the turbine blades 27, 34. After driving each of turbines 28 and 32, the combustion products leave core engine 14 through an exhaust nozzle 38.

Fan section 16 includes a rotatable, axial-flow fan rotor 30 and a plurality of fan rotor blades 44 that are surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 30 and the plurality of fan rotor blades 44.

From a flow standpoint, it will be appreciated that an initial air flow, represented by arrow 50, enters gas turbine engine 10 through an inlet 52. Air flow 50 passes through fan blades 44 and splits into a first compressed air flow (represented by arrow 54) that moves through the fan casing 40 and a second compressed air flow (represented by arrow 56) which enters booster compressor 22. The pressure of second compressed air flow 56 is increased and enters high pressure compressor 24, as represented by arrow 58. After mixing with fuel and being combusted in combustor 26, combustion products 46 exit combustor 26 and flow through first turbine 28. Combustion products 46 then flow through second turbine 32 and exit exhaust nozzle 38 to provide thrust for gas turbine engine 10.

Figure 22:
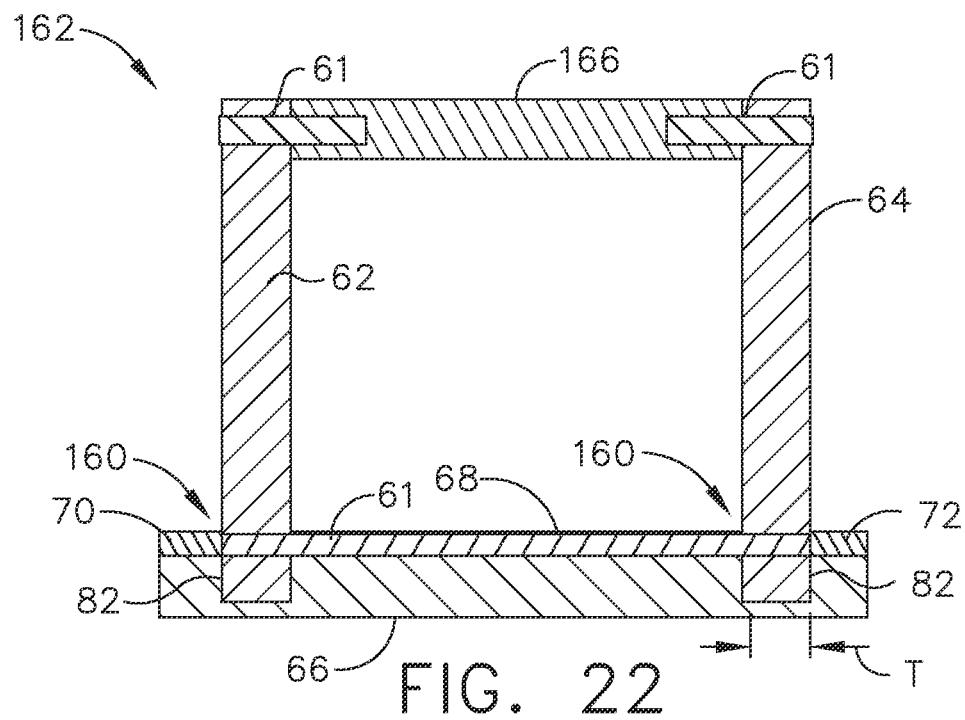
FIG. 22 illustrates another embodiment of a shroud segment including a plurality of subcomponents and at least one interlocking mechanical joint in a joined state, in accordance with one or more embodiments shown or described herein.
Figure 23:
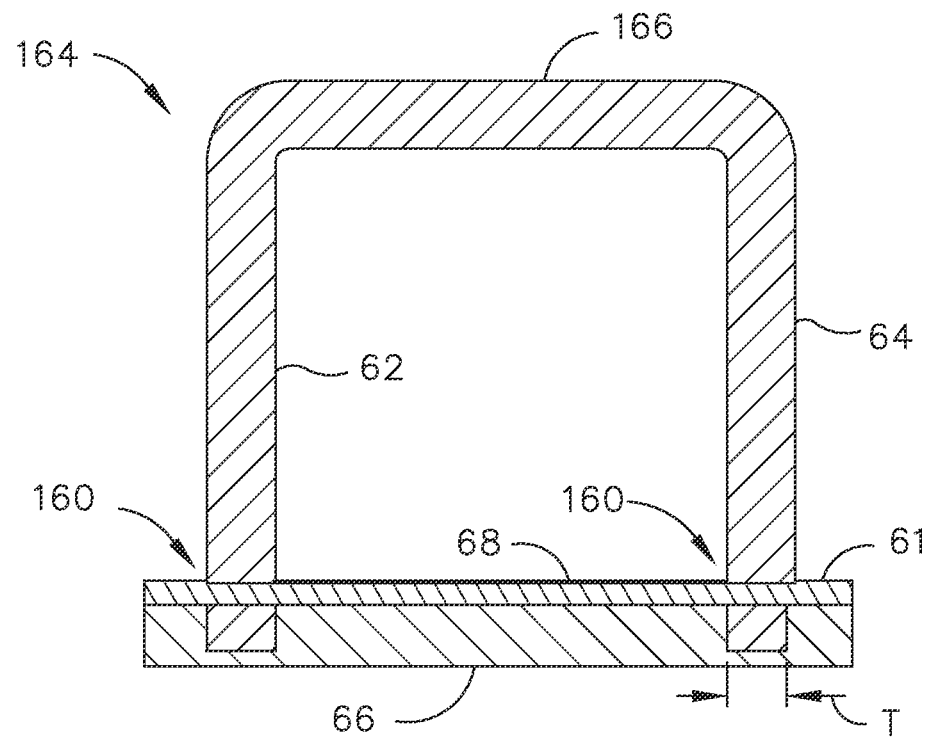
FIG. 23 illustrates another embodiment of a shroud segment including a plurality of subcomponents and at least one interlocking mechanical joint in a joined state, in accordance with one or more embodiments shown or described herein.

Many of the engine components may be fabricated in several pieces, due to complex geometries, and are subsequently joined together. These components may also be directly subjected to hot combustion gases during operation of the engine 10 and thus have very demanding material requirements. Accordingly, the arcuate components of the engine 10 that are fabricated from ceramic matrix composites (CMCs) may be fabricated in more than one piece and subsequently joined together. Of particular concern herein are the plurality of shroud segments that make up the shroud and the joining of the plurality of subcomponents that make up each segment. In the embodiment described herein, the shroud segments may be formed as open shroud segments, as illustrated in FIG. 2-21, or as box shroud segments, as illustrated in FIGS. 22 and 23. As previously stated, ceramic matrix composites (CMCs) are an attractive material for turbine applications, because CMCs have high temperature capability and are light weight.

In joining multiple CMC pieces, or subcomponents, such as a plurality of shroud segments, to form a complete component structure, such as a shroud, it is desirable to form joints that are damage tolerant and exhibit tough, graceful failure. If the mechanical joint that joints the multiple CMC subcomponents fails, it may result in a catastrophic failure of the component structure.

Of particular concern for these joints is that the bond line tends to be brittle in nature, which could lead to brittle failure of the joint. It has been established in the CMC art that this limitation can be addressed by keeping the stress in the bond low by controlling the surface area of the bond and by making use of simple woodworking type joints such as butt joints, lap joints, tongue and groove joints, mortise and tenon joints, as well as more elaborate sawtooth or stepped tapered joints. Alternatively, joints that contain a mechanical interlock of tough CMC sub-components have also demonstrated graceful failure. Conventional woodworking joints such as dovetail joints have been demonstrated. The above joints can be used to join CMC sub-components in two or three dimensions such as flat plates and "T" shapes. While many woodworking type joints can create a mechanical interlock between two CMC subcomponents, in order for the interlock to take advantage of the full toughness of the CMC, the interlocking feature must be oriented such that the reinforcing fibers would be required to break in order to fail the interlock. If the interlocking feature is oriented such that the joint can be liberated by failing one of the CMC subcomponents in the interlaminar direction, then toughness of the interlock may be limited by the interlaminar properties of the CMC. In general, the interlaminar strength and toughness of CMCs are significantly lower than the in-plane properties.

Figure 2:
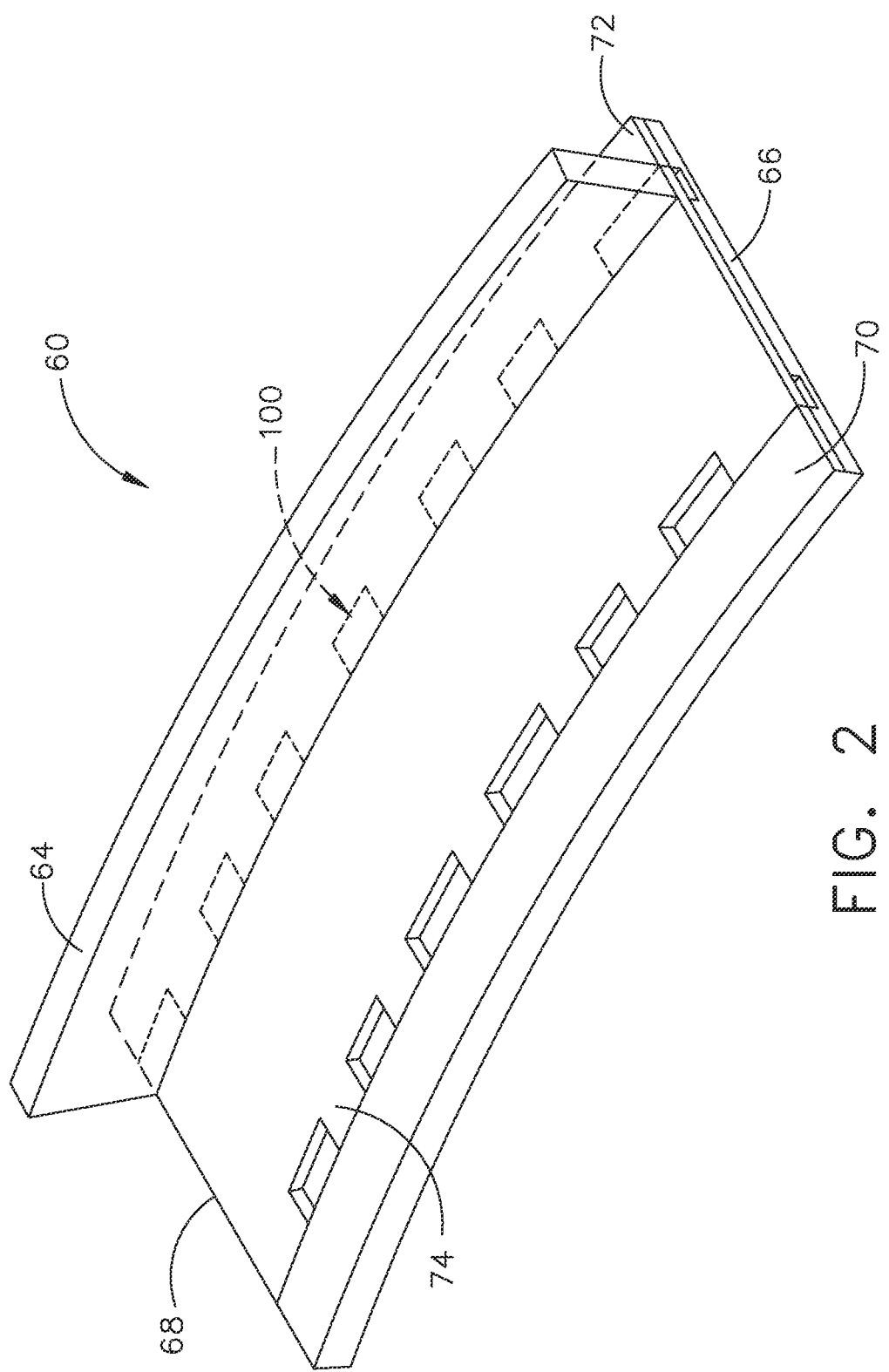
FIG. 2 is a schematic perspective view of a portion of a gas turbine shroud, and more specifically, a shroud segment with up to one or more radial walls omitted for clarity in accordance with one or more embodiments shown or described herein.
Figure 3:
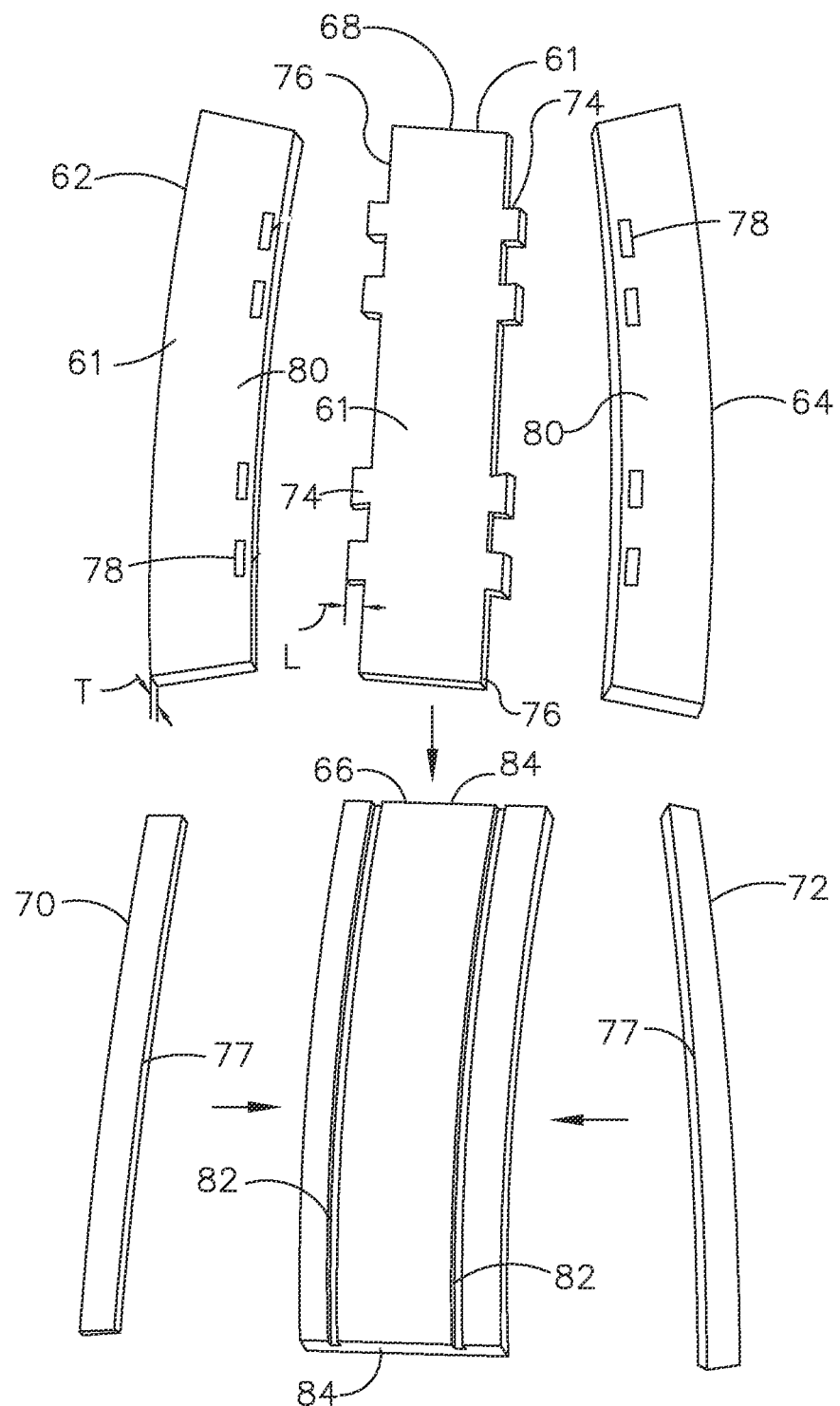
FIG. 3 is a simplified schematic view of a plurality of subcomponents of the shroud segment of FIG. 2 in an unjoined state, in accordance with one or more embodiments shown or described herein.
Figure 4:
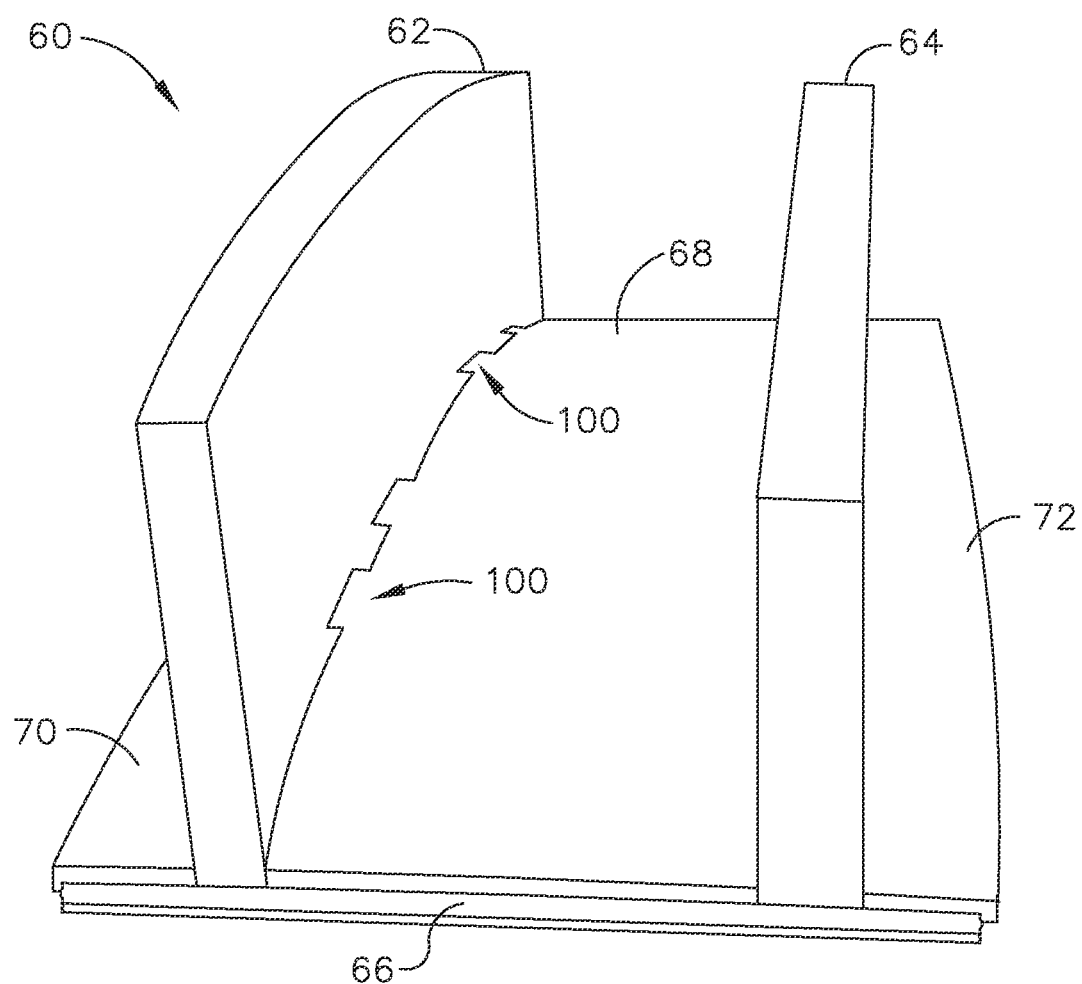
FIG. 4 is a schematic perspective end view of the shroud segment of FIGS. 2 and 3, in accordance with one or more embodiments shown or described herein.

Referring now to FIGS. 2-4, illustrated in a joined simplified perspective view, an unjoined schematic view, and a joined simplified end perspective view, respectively, is a shroud segment 60 that forms a portion of shroud component, such as shroud 36 of FIG. 1. The shroud segment 60 is comprised of a forward radial wall 62, an aft radial wall 64, and at least one interlocking subcomponent 61, such as a flowpath 66, and a flowpath cap 68 including one or more interlocking features (described herein). In each of the embodiment disclosed herein, the shroud segment may optionally include a forward overhang 70 and an aft overhang 72. As best illustrated in FIG. 3, in this particular embodiment, the interlocking subcomponent 61 is the flowpath cap 68 having defined therein at least one interlocking feature, and more particularly, a plurality of tabs 74 extending from longitudinally extending opposed edges 76 that define the flowpath cap 68. Each of the forward radial wall 62 and the aft radial wall 64 have a plurality of openings 78 formed therein and along a longitudinally extending lower edge 80, and configured to cooperatively engage with the plurality of tabs 74 of the flowpath cap 68 to form an interlocking mechanical joint 100. In this particular embodiment, in addition the flow path 66 includes a plurality of slots 82, extending between axially extending opposed edges 84 of the flowpath 66. The plurality of slots 82 are configured in cooperative engagement with the longitudinally extending lower edges 80, of each of the forward radial wall 62 and the aft radial wall 64 when assembled.

As illustrated in FIG. 4, the plurality of subcomponents are assembled into the shroud segment 60 that forms a portion of shroud component, such as shroud 36 of FIG. 1. In this particular embodiment, at least the forward radial wall 62, the aft radial wall 64 and the flowpath cap 68 are constructed from a ceramic matrix composite (CMC) material of a known type. In particular, the CMC material includes a plurality of reinforcing fibers embedded in a matrix and wherein the plurality of reinforcing fibers are oriented substantially along a length of the component. In addition, the flowpath 66, the forward overhang 70 and the aft overhang 72 may be formed of a CMC material wherein a plurality of reinforcing fibers that comprise the CMC material are oriented substantially along a length of the component. In an alternate embodiment, one or more of the subcomponents is formed of a ceramic matrix composite (CMC) material of a known type, while the remaining subcomponents are formed of a monolithic ceramic material. Accordingly, the assembled shroud segment 60 may include one or more CMC subcomponents and one or more monolithic ceramic subcomponents, or all subcomponents may be of a ceramic matrix composite (CMC) material.

Monolithic ceramics, such as SiC are typically brittle materials. The stress strain curve for such a material is generally a straight line that terminates when the sample fractures. The failure stress is often dictated by the presence of flaws and failure occurs by rapid crack growth from a critical flaw. The abrupt failure is sometimes referred to as brittle or catastrophic failure. While the strength and failure strain of the ceramic are flaw dependent, it is not uncommon for failure strains to be on the order of ~0.1%.

Generally, CMC materials include a high strength ceramic type fiber, such as Hi-Nicalon™ Type S manufactured by COI Ceramics, Inc. The fiber is embedded in a ceramic type matrix, such as SiC or SiC that contains residual free silicon. In the example of a SiC-SiC composite, where SiC fiber reinforces a SiC matrix, an interface coating such as Boron Nitride is typically applied to the fiber. This coating allows the fiber to debond from the matrix and slide in the vicinity of a matrix crack. A stress-strain curve for the fast fracture of a SiC-SiC composite generally has an initial linear elastic portion where the stress and strain are proportional to each other. As the load is increased, eventually the matrix will crack. In a well-made composite, the crack will be bridged by the reinforcing fiber. As the load on the composite is further increased, additional matrix cracks will form, and these cracks will also be bridged by the fibers. As the matrix cracks, it sheds load to the fibers and the stress strain curve becomes non-linear. The onset of non-linear stress-strain behavior is commonly referred to as the proportional limit or the matrix cracking stress. The bridging fibers impart toughness to the composite as they debond from the matrix and slide in the vicinity of the matrix cracks. At the location of a through crack, the fibers carry the entire load that is applied to the composite. Eventually, the load is great enough that the fibers fail, which leads to composite failure. The ability of the CMC to carry load after matrix cracking is often referred to as graceful failure. The damage tolerance exhibited by CMCs makes them desirable over monolithic ceramics that fail catastrophically.

CMC materials are orthotropic to at least some degree, i.e. the material's tensile strength in the direction parallel to the length of the fibers (the fiber direction, or 0 degree direction) is stronger than the tensile strength in the perpendicular directions (the 90 degree or the interlaminar/through thickness direction). Physical properties such as modulus and Poisson's ratio also differ with respect to fiber orientation. Most composites have fibers oriented in multiple directions. For example, in the prepreg MI SiC-SiSiC CMC, the architecture is comprised of layers, or plies, of unidirectional fibers. A common architecture consists of alternating layers of 0 and 90 degree fibers, which imparts toughness in all directions in the plane of the fibers. This ply level architecture does not, however, have fibers that run in the through thickness or interlaminar direction. Consequently, the strength and toughness of this composite is lower in the interlaminar direction than in the in-plane directions.

CMCs exhibit tough behavior and graceful failure when matrix cracks are bridged by fibers. Of greatest concern herein is failure of the joints that are formed when the CMC material components forming the shroud segment 60 are joined together, in response to an applied load. If any of the joints are loaded in a direction such that they can fail and separate without breaking fibers, then there is the potential for brittle, catastrophic failure of that joint. Alternatively, if any of the joints are loaded in a direction such that, after matrix cracking in the joint, fibers bridge the crack, then there is the potential for tough, damage tolerant, graceful failure of the joint.

Referring now to FIGS. 5-9 illustrated are a plurality of alternate interlocking mechanical joints that may be used to form the interlocking mechanical joint 100 for joining the forward and aft radial walls 62, 64 and the flowpath cap 68 of FIGS. 2-4 to form a larger component structure with varying strength results. As illustrated, each figure is depicted having a simplified block geometry and illustrated noting the linear direction of the fibers within the component, as linear fill lines. However, the fibers in individual plies may be oriented in any direction within the plane defined by the fill line as projected in and out of the page. In each of the embodiments disclosed herein, the described interlocking mechanical joints may be used to join the forward radial wall 62 and the aft radial wall 64 to an interlocking subcomponent, such as the flowpath cap 68 of FIG. 2, to form a larger or complete component structure, such as shroud 36 of FIG. 1. In alternate embodiments, any of the subcomponents, the forward radial wall 62, the aft radial wall 64, the flowpath cap 68, the flowpath 66, the forward overhang 70 and/or the aft overhang 72 may be comprised as a monolithic ceramic subcomponent.

Figure 5:
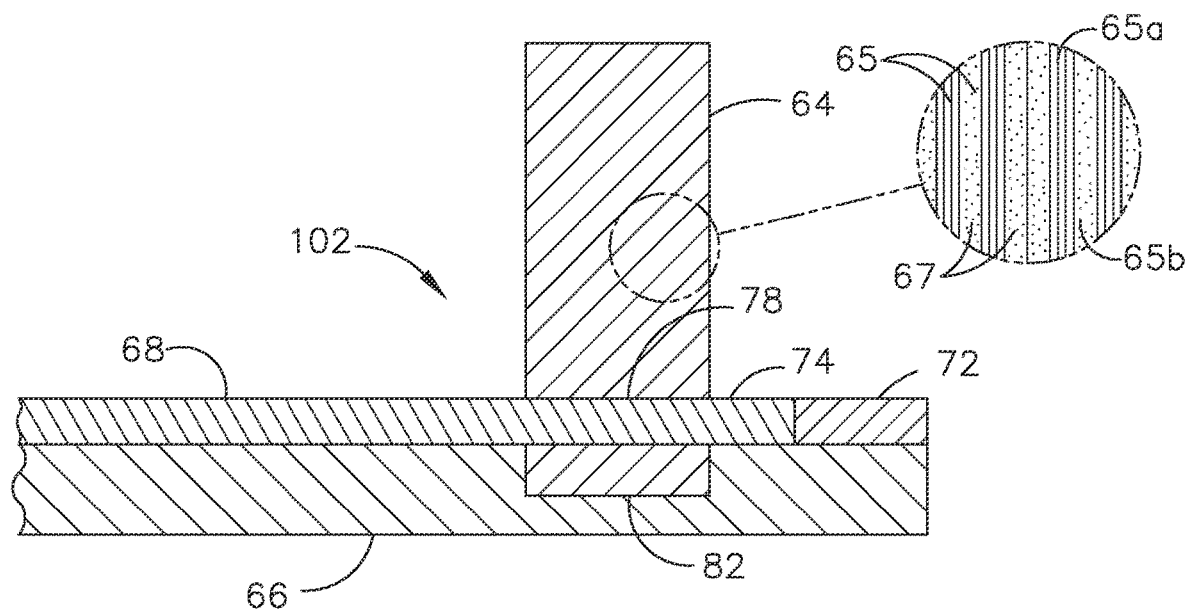
FIG. 5 illustrates a mechanical interlocking mechanical joint for joining a plurality of subcomponents of a shroud segment, in accordance with one or more embodiments shown or described herein.
Figure 6:
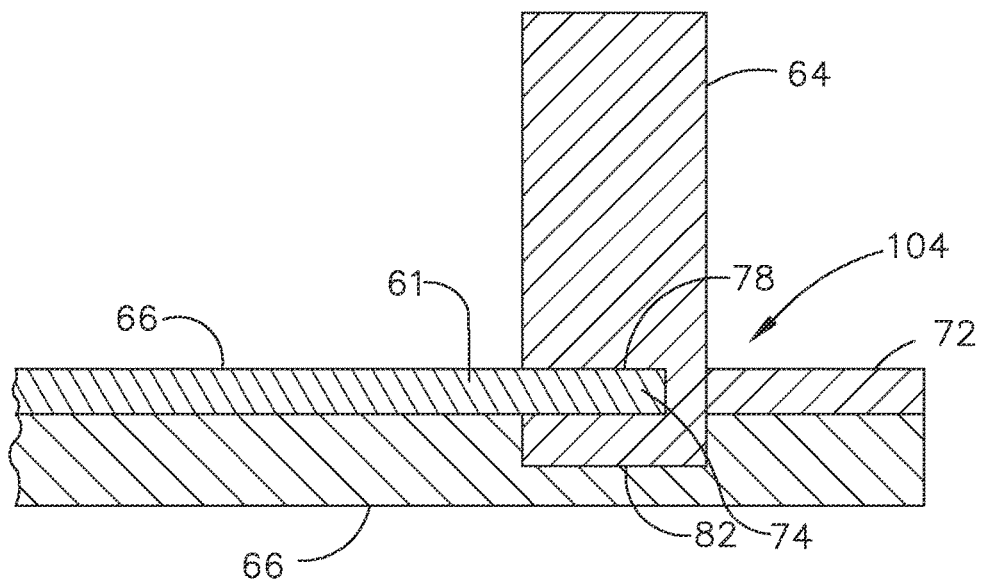
FIG. 6 illustrates a mechanical interlocking mechanical joint for joining a plurality of subcomponents of a shroud segment, in accordance with one or more embodiments shown or described herein.

Referring more specifically to FIG. 5, illustrated in simplified sectional view is an interlocking mechanical joint 102, joining together the aft radial wall 64 and the flowpath cap 68. It should be noted that in the embodiments illustrating and describing the interlocking mechanical joints that while a single radial wall may be illustrated, a similar interlocking mechanical joint would be applied to the other of the radial wall when joined to the interlocking subcomponent, such as the flowpath cap 68, the flowpath 66, the forward and aft overhangs 70, 72, or the like. In the embodiment of FIG. 5, as previously noted, illustrated is the aft radial wall 64 being joined thereto the flowpath cap 68 at an interlocking mechanical joint 102. In the illustrated embodiment, the aft radial wall 64 is formed of a ceramic matrix composite (CMC) including reinforcing fibers embedded in a matrix. The flowpath cap 68 is also formed of a ceramic matrix composite (CMC) including reinforcing fibers embedded in a matrix. In an alternate embodiment, either the aft radial wall 64 or the flowpath cap 68 is formed as a ceramic monolithic subcomponent. The aft radial wall 64 and the flowpath cap 68 are illustrated in a joined state in FIG. 5. As best illustrated in FIG. 5, the aft radial wall 64 and the flowpath cap 68 are illustrated joined one to the other at the interlocking mechanical joint 102. In this particular embodiment, joint 102 is configured as a typical woodworking mortise and tenon-type joint. More particularly, the aft radial wall 64 and the flowpath cap 68 are configured wherein the plurality of tabs 74 of the flowpath cap 68 (of which only one is illustrated) engage with the openings 78 (FIG. 3) formed in the aft radial wall 64. As used herein the term "engage" and "sliding engagement" include fixed or non-fixed insertion therein of the tabs 74, relative to the openings 78, so that the tabs 74 extend through the aft radial wall 64 and protrude therefrom. In an alternate embodiment, the tabs 74 may extend only partially through the openings 78 in the aft radial wall 64, as best illustrated in the interlocking mechanical joint 104 of FIG. 6. In addition, the aft radial wall 64 is engaged with the slots 82 formed in the flowpath 66.

As illustrated in the blown-out enlargement of FIG. 5, in the embodiments disclosed herein, each of the components that form the shroud segments, including the forward radial wall 62, the aft radial wall 64, the flowpath cap 68, the flowpath 66, the forward overhang 70, the aft overhang 72 and interlocking CMC pin 118, are comprised of a plurality of fibers 65 forming plies 67 oriented in the plane of the respective component so as to provide improved interlocking of the joint and minimize joint failure. In the embodiment of FIG. 5, as illustrated the plurality of fibers 65 extend from top to bottom in a layer 65*a* and into and out of the paper in a layer 65*b*. In the illustrated embodiment, the architecture of the plies 66 is symmetric about a mid-plane of the component, and in particular the aft radial wall 74. Maintaining symmetry of the component plies 67 helps to minimize any distortion or stresses that may arise due to any differences between 0 degree and 90 degree plies. The illustrated 8-ply panel is illustrated having a typical architecture (0/90/0/90:90:90/0/90/0), which is symmetric about the mid-plane. In an alternate embodiment, the plies are not symmetric about the mid-plane. In an alternate embodiment, the architecture includes plies oriented in a direction other than 0 or 90 degrees, such as +/−45 degrees, some other angle, or a combination of various angles. In an embodiment, the expected loading direction would require the forward radial wall 62 or aft radial wall 64 to pull away from the flowpath cap 68 (in the vertical direction as oriented in the figures). In an embodiment, the plurality of fibers (similar to fibers 65 previously described with regard to FIG. 5) forming the aft radial wall 64 and the flowpath cap 68 are not connected by fibers as none of the fibers bridge the joint. The expected loading direction would require the forward radial wall 62 or aft radial wall 64 to pull away from the flowpath cap 68 (in the vertical direction as oriented in the figures). The fibers in the plurality of tabs 74 are interlocked with the fibers below the plurality of openings 78 and thus the fibers in the plurality of tabs 74 and/or the fibers below the plurality of openings 78 would need to break in order for the forward radial wall 62 or the aft radial wall 64 to be separated from the flowpath 66. In this manner, the joint has toughness in the loading direction.

Figure 7:
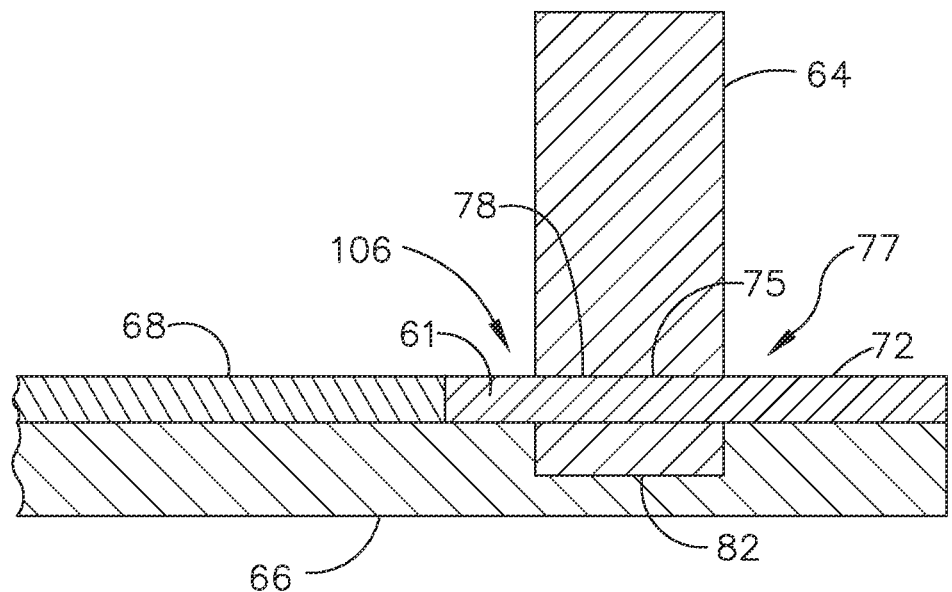
FIG. 7 illustrates a mechanical interlocking mechanical joint for joining a plurality of subcomponents of a shroud segment, in accordance with one or more embodiments shown or described herein.

Referring now to FIG. 7, illustrated is another embodiment of an interlocking mechanical joint, referenced 106. In this particular embodiment, the at least one interlocking subcomponent 61 are the forward overhang 70 and the aft overhang 72, each having defined therein at least one interlocking feature, and more particularly, a plurality of tabs 75 extending from longitudinally extending edges 77 (FIG. 3) that define each of the forward overhang 70 and the aft overhang 72. The tabs 75 are formed extending from each of the forward overhang 70 (FIG. 3) and the aft overhang 72 (illustrated) in a manner so as to engage with the openings 78 formed in the aft radial wall 64. Similar to the previous embodiment, the tabs 75 include fixed or non-fixed insertion therein the openings 78, so that the tabs 75 extend through the aft radial wall 64 and protrude therefrom. In an alternate embodiment, the tabs 75 may extend only partially through the openings 78 in the aft radial wall 64. In addition, the aft radial wall 64 is engaged with the slots 82 formed in the flowpath 66. Similar to the embodiment of FIG. 5, as a result, a plurality of fibers (similar to fibers 65 previously described with regard to FIG. 5) forming the aft radial wall 64 and the aft overhang 72 are oriented at substantially right angles relative to one another. In this particular embodiment, the aft radial wall 64 and the aft overhang 72 are not connected by fibers as none of the fibers bridge the interlocking mechanical joint 106.

Figure 8:
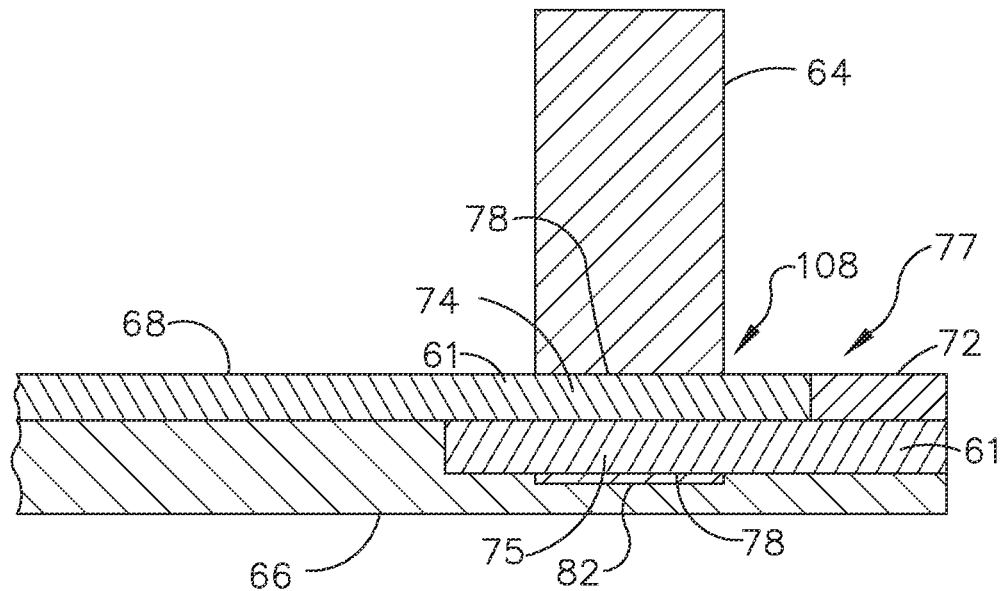
FIG. 8 illustrates another embodiment of a mechanical interlocking mechanical joint for joining a plurality of subcomponents of a shroud segment, in accordance with one or more embodiments shown or described herein.

Referring now to FIG. 8, illustrated is another embodiment of an interlocking mechanical joint, referenced 108. In this particular embodiment, the one or more interlocking subcomponents 61 are the flowpath cap 68 having defined therein at least one interlocking feature, and more particularly, a plurality of tabs 74 extending from longitudinally extending opposed edges 76 that define the flowpath cap 68 and the forward overhang 70 (FIG. 3) and the aft overhang 72 (illustrated) having defined therein at least one interlocking feature, and more particularly, a plurality of tabs 75 extending from longitudinally extending edges 77. The tabs 74 and 75 are formed extending from each of the forward overhang 70 (FIG. 3) and the aft overhang 72 (illustrated), and from the flowpath cap 68 in a manner so as to engage with the openings 78 formed in the aft radial wall 64 and form an overlapping tab interlock. Similar to the previous embodiments, the tabs 74, 75 include fixed or non-fixed insertion therein the openings 78, so that the tabs 74, 75 extend through the forward radial wall 62 and the aft radial wall 64 and protrude therefrom. In an alternate embodiment, the tabs 74, 75 may extend only partially through the openings 78 in the aft radial wall 64. In addition, the aft radial wall 64 is engaged with the slots 82 formed in the flowpath 66. Similar to the previous embodiments, as a result, a plurality of fibers (similar to fibers 65 previously described with regard to FIG. 5) forming the aft radial wall 64 are oriented at substantially right angles to a plurality of fibers forming the flowpath cap 68 and the aft overhang 72. In this particular embodiment, the aft radial wall 64, the flowpath cap 68 and the aft overhang 72 are not connected by fibers as none of the fibers bridge the interlocking mechanical joint 108.

Figure 9:
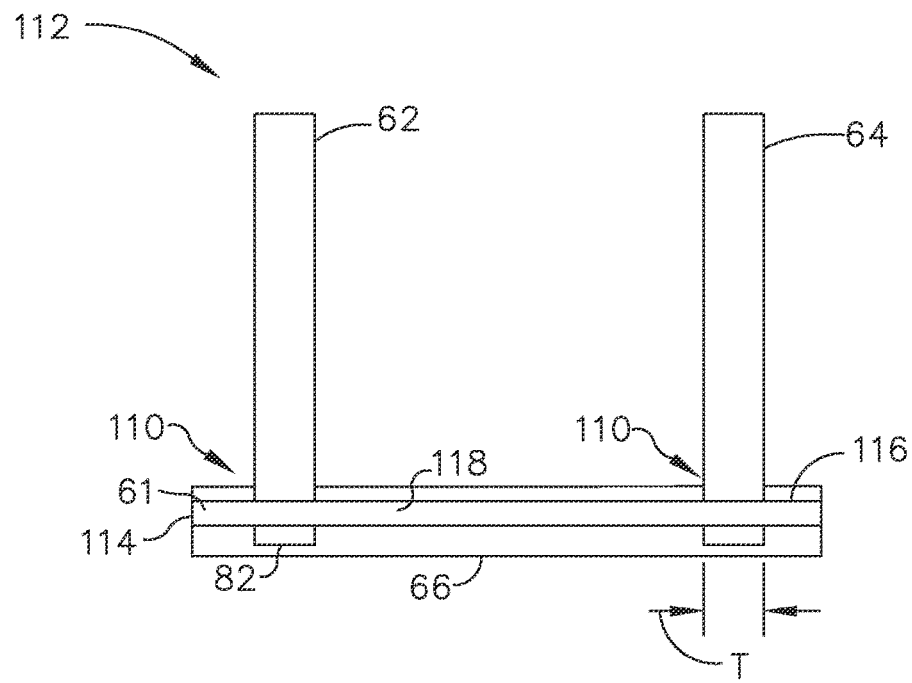
FIG. 9 illustrates another embodiment of a mechanical interlocking mechanical joint for joining a plurality of subcomponents of a shroud segment, in accordance with one or more embodiments shown or described herein.
Figure 10:
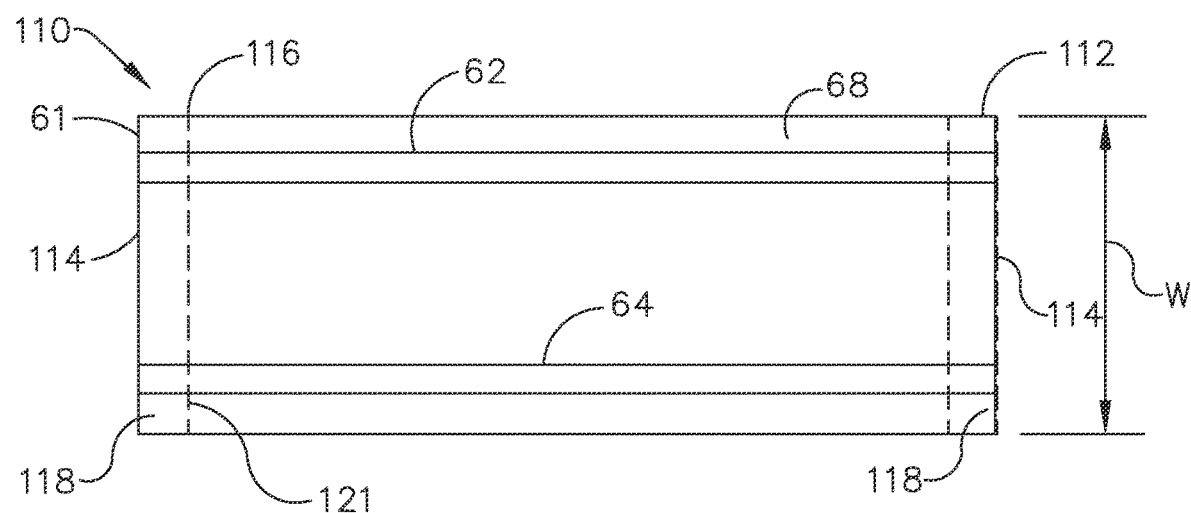
FIG. 10 illustrates a top view of the mechanical interlocking mechanical joint of FIG. 9, in accordance with one or more embodiments shown or described herein.
Figure 11:
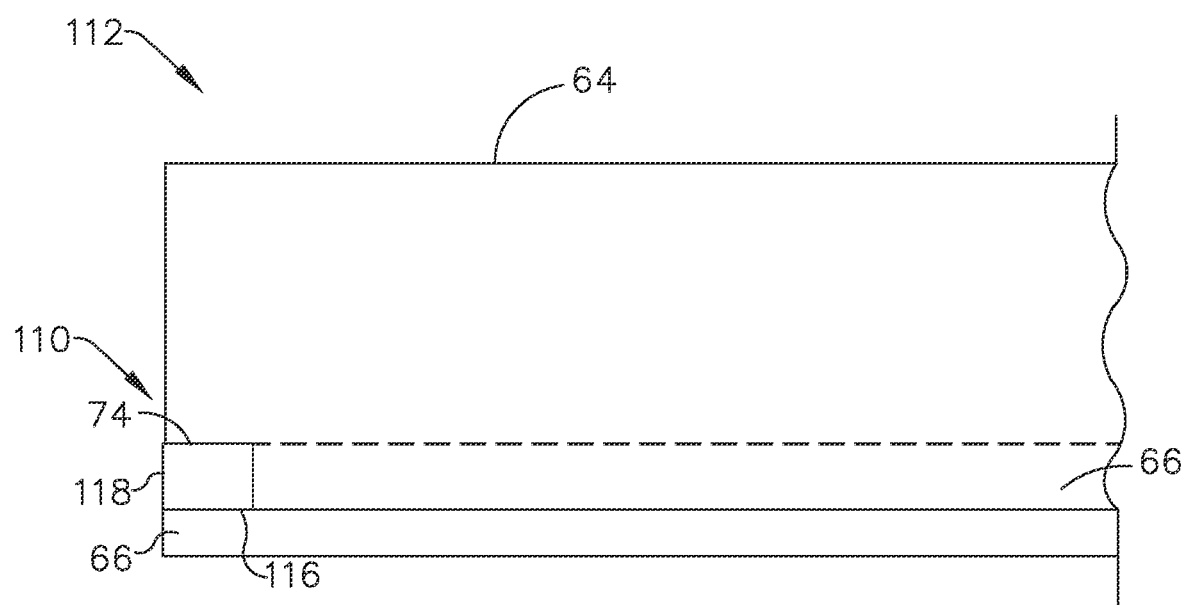
FIG. 11 illustrates the mechanical interlocking mechanical joint of FIG. 9, in accordance with one or more embodiments shown or described herein.

Referring now to FIGS. 9-11, illustrated is another embodiment of an interlocking mechanical joint, referenced 110. More particularly, illustrated in FIG. 9 is a shroud segment 112, generally similar to shroud segment 60 of FIG. 2, including the interlocking mechanical joint 110, in an end view. FIG. 10 is a top view, and FIG. 11 is a side elevation view, illustrating the interlocking mechanical joint 110. In this particular embodiment, subsequent to the disposing of each of the forward radial wall 62 and the aft radial wall 64 within a respective slot 82 in the flowpath 66, a receiving slot 116 is formed at opposed ends 114 extending through the shroud segment 112 and the forward and aft radial walls 62, 64. The receiving slots 116 extending a width "W" of the shroud segment 112, as illustrated in FIG. 10. At least one interlocking subcomponent 61, comprising a plurality of interlocking CMC pins 118 are disposed within each of the receiving slots 116 in a manner so as to form the interlocking mechanical joint 110. The interlocking CMC pin 118 provides a toughened or stronger joint between each of the forward radial wall 62, the aft radial wall 64 and the flowpath 66. The toughened joint will have an increased ability to withstand applied forces exerted thereon the forward radial wall 62 and the aft radial wall 62, as described herein. As previously described, to provide for such interlocking CMC pin 118, the forward radial wall 62, the aft radial wall 64 and the flowpath 66 have formed therein the receiving slot 116, extending across an interlaminar thickness "T" of each of the forward and aft radial walls 64 and the width "W" of the flowpath 66. For positioning of the interlocking CMC pin 118 in the receiving slot 116, each of the forward radial wall 62 and the aft radial wall 64 are positioned within a respective groove 82 of the flowpath 66 and the interlocking CMC pin 118 is inserted from one side of the flowpath 66 into the receiving slot 116 with a sliding fit until the interlocking CMC pin 118 strikes against an abutment 121 of the receiving slot 116 when the interlocking CMC pin 118 has reached the optimal position within the flowpath 66 and respective forward and aft radial walls 62, 64.

Similar to the previous embodiments including the tabs 74 (FIGS. 2-8), the interlocking pin 118 may include fixed or non-fixed insertion therein the receiving slot 116. In addition, similar to the previous embodiments, as a result, a plurality of fibers (similar to fibers 65 previously described with regard to FIG. 5) forming the forward radial wall 62 and the aft radial wall 64 are oriented at substantially right angles to a plurality of fibers forming the interlocking pin 118. In this particular embodiment, the forward radial wall 62, the aft radial wall 64 and the interlocking pin 118 are not connected by fibers as none of the fibers bridge the interlocking mechanical joint 110. In an alternative embodiment, the fibers are oriented in one direction (all at 0 degree or all at 90 degrees, depending on the reference angle). In an embodiment, the pin 118 includes all of its fibers oriented uni-directionally (i.e. running left to right across the page).

Figure 12:
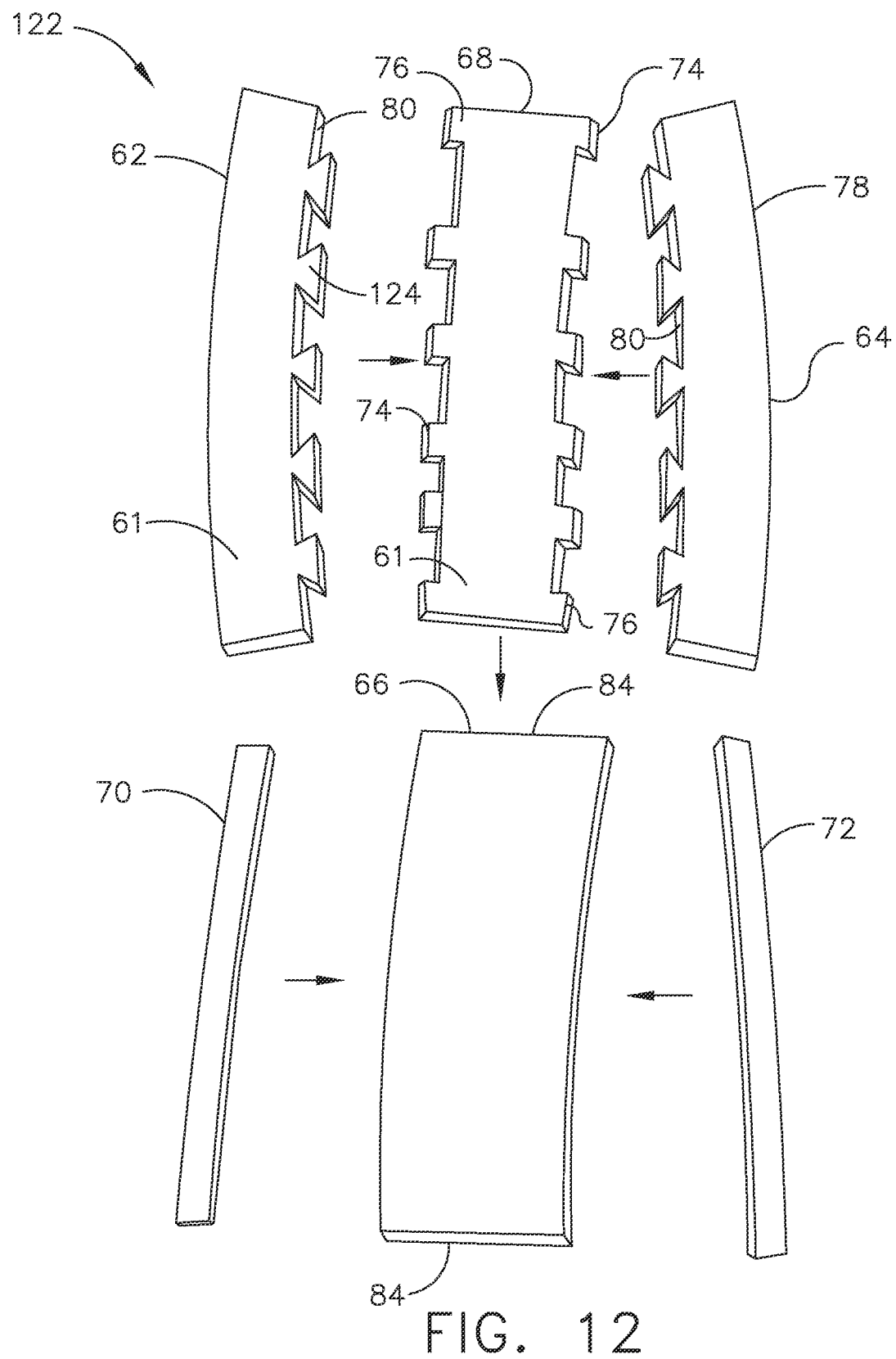
FIG. 12 illustrates another embodiment of a mechanical interlocking mechanical joint in a partially unjoined state for joining a plurality of subcomponents of a shroud segment, in accordance with one or more embodiments shown or described herein.
Figure 13:
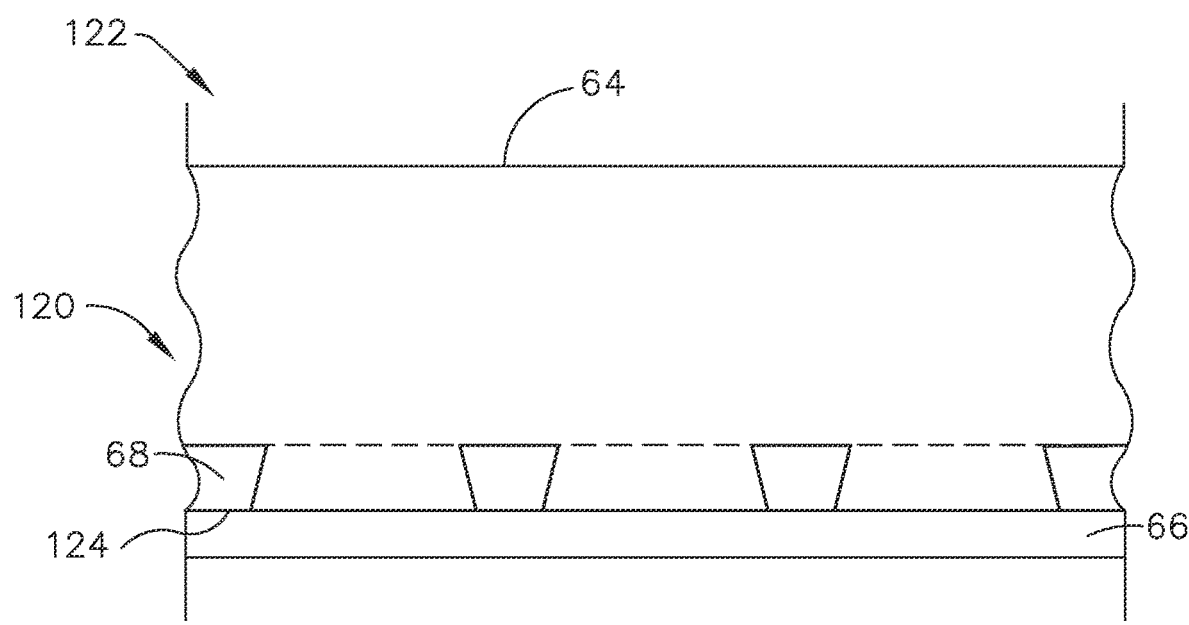
FIG. 13 illustrates a portion of mechanical interlocking joint of FIG. 12 illustration the plurality of subcomponents of the shroud segment in a joined state, in accordance with one or more embodiments shown or described herein.

Referring now to FIGS. 12 and 13, illustrated in an unjoined schematic view, and a joined simplified side view, respectively, is a shroud segment 122 that forms a portion of a shroud component, such as shroud 36 of FIG. 1. The shroud segment 122 is comprised of a forward radial wall 62, an aft radial wall 64, a flowpath 66, a forward overhang 70 and an aft overhang 72 and at least one interlocking subcomponent, in the form of a flowpath cap 68. As best illustrated in FIG. 12, in this particular embodiment, the flowpath cap 68 has defined therein a plurality of tabs 74 extending from longitudinally extending opposed edges 76 that define the flowpath cap 68. Each of the forward radial wall 62 and the aft radial wall 64 have a plurality of dovetails 124 formed therein and along a longitudinally extending lower edge 80, and configured to cooperatively engage with the plurality of tabs 74 of the flowpath cap 68 to form an interlocking mechanical joint 120. In this particular embodiment, the flowpath 66 is a continuous flowpath 66 on top of which the previously described assembly is disposed.

Similar to the previous embodiments including the tabs 74 (FIGS. 2-8), the tabs 74 may include fixed or non-fixed insertion relative to the dovetails 124. In addition, similar to the previous embodiments, as a result, a plurality of fibers (similar to fibers 65 previously described with regard to FIG. 5) forming the forward radial wall 62 and the aft radial wall 64 are oriented at substantially right angles to a plurality of fibers forming the flowpath cap 68. In this particular embodiment, the forward radial wall 62, the aft radial wall 64 and the flowpath cap 68 are not connected by fibers as none of the fibers bridge the interlocking mechanical joint 120.

Figure 14:
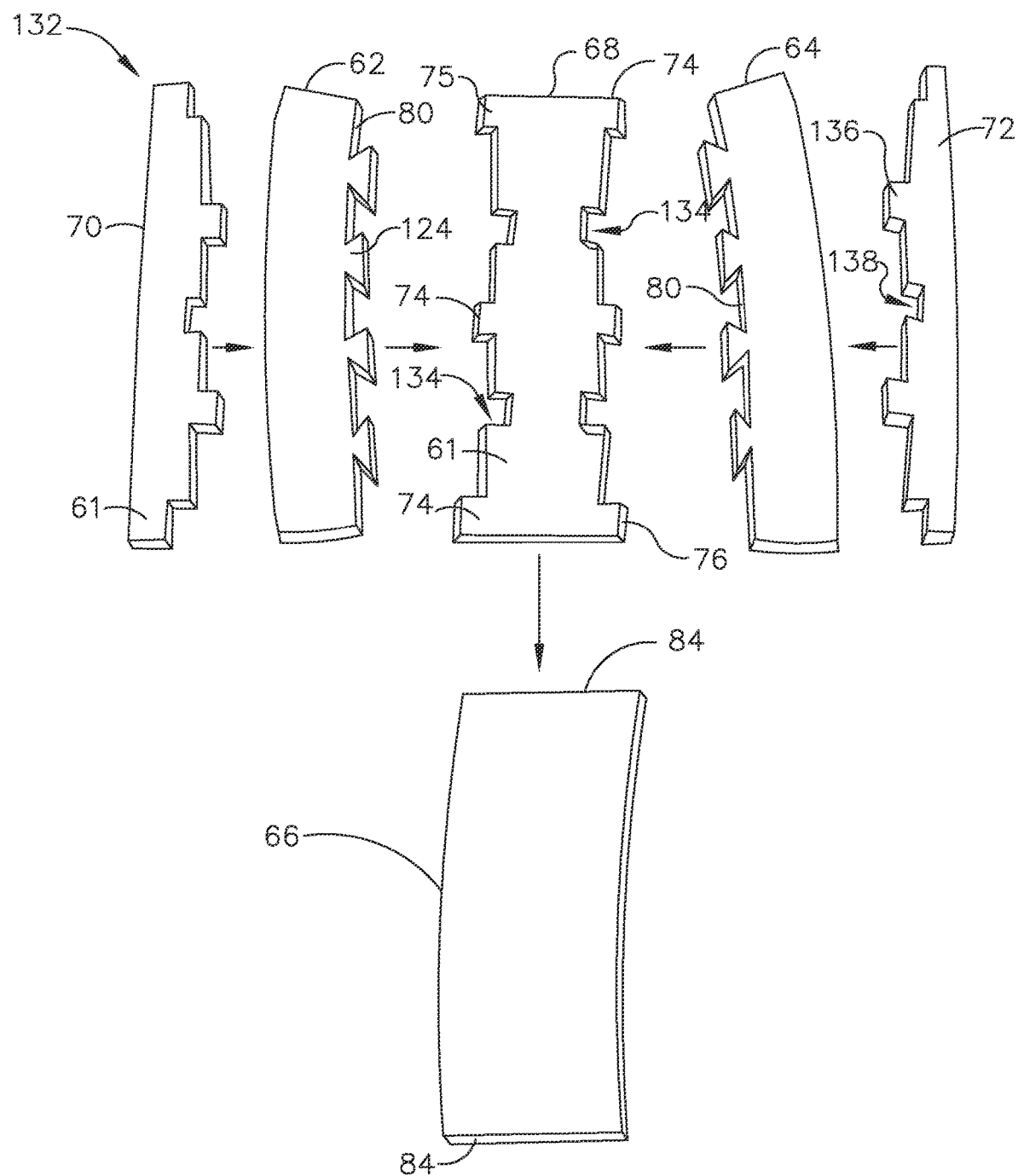
FIG. 14 illustrates another embodiment of a mechanical interlocking mechanical joint in a partially unjoined state for joining a plurality of subcomponents of a shroud segment, in accordance with one or more embodiments shown or described herein.
Figure 15:
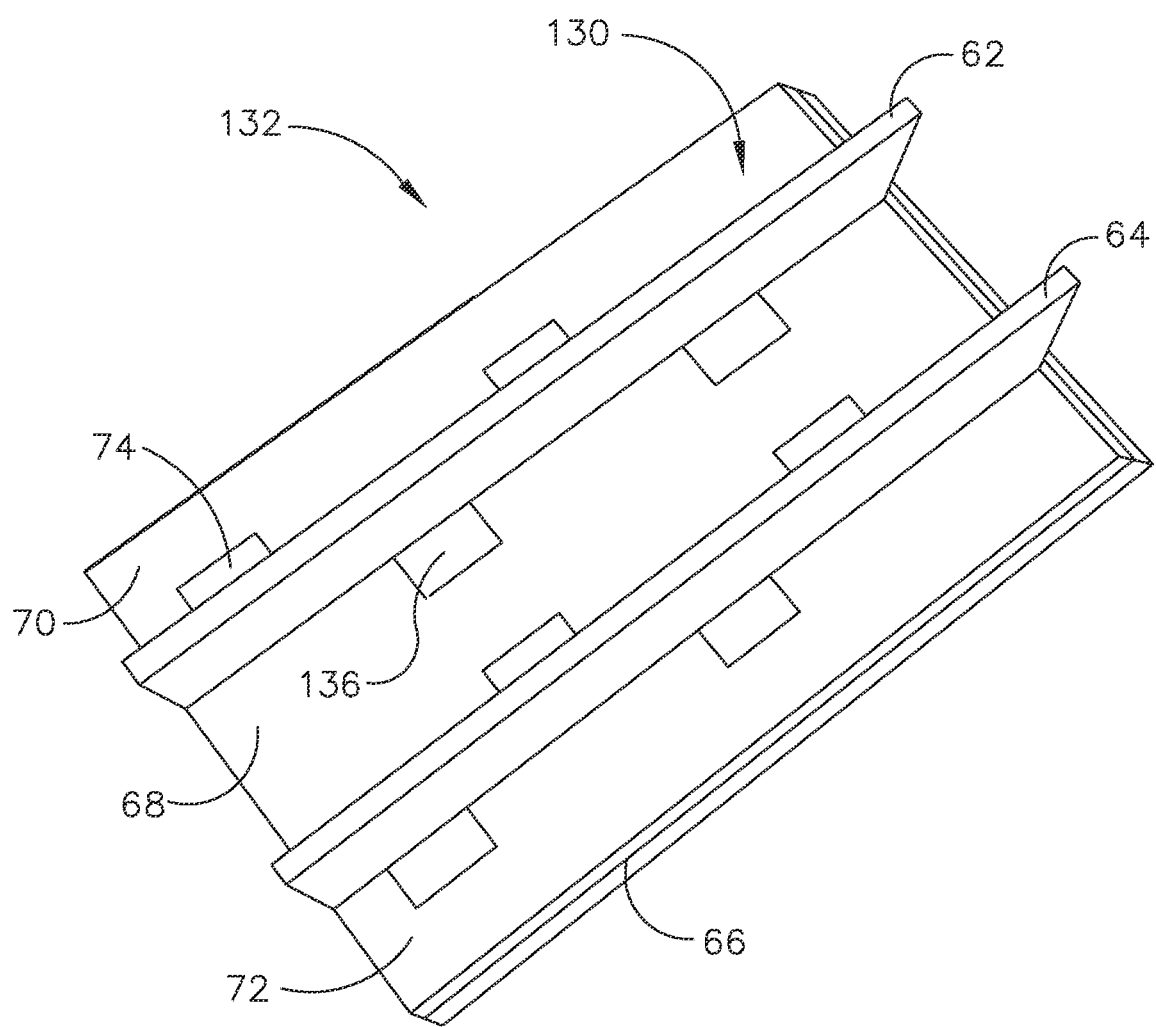
FIG. 15 illustrates the plurality of subcomponents of the shroud segment of FIG. 14 in a joined state, in accordance with one or more embodiments shown or described herein.

Referring now to FIGS. 14 and 15, illustrated in an unjoined schematic view, and a joined schematic view, respectively, is a shroud segment 132 that forms a portion of a shroud component, such as shroud 36 of FIG. 1. As in the previous embodiment, the shroud segment 132 is comprised of a forward radial wall 62, an aft radial wall 64, a flowpath 66, and at least one interlocking subcomponent, in the form of a flowpath cap 68, a forward overhang 70 and an aft overhang 72. As best illustrated in FIG. 14, in this particular embodiment, the flowpath cap 68 has defined therein a plurality of tabs 74 extending from longitudinally extending opposed edges 76 that define the flowcap 68. In contrast to the previous embodiments, in this particular embodiment, the flowcap 68 further includes a plurality of indentions 134 formed in the longitudinally extending opposed edges 76. Similar to the previous embodiment, each of the forward radial wall 62 and the aft radial wall 64 include a plurality of dovetails 124 formed therein and along a longitudinally extending lower edge 80, and configured to cooperatively engage with the plurality of tabs 74 of the flowpath cap 68. Furthermore, in this embodiment, each of the forward overhang 70 and the aft overhang 72 include a plurality of tabs 136 and a plurality of indentions 138 formed therein. Each of the plurality of tabs 74 and indentions 134 are configured to cooperatively engage with the pluralities of tabs 74 and indentions 134 of the flowpath cap 68 and the dovetails 124 of the forward radial wall 62 and the aft radial wall, in combination aiding in the assembly and forming of an interlocking mechanical joint 130. Similar to the previous embodiment, the flowpath 66 is a continuous flowpath 66 on top of which the previously described assembly is disposed.

Similar to the previous embodiments including the tabs 74 (FIGS. 2-8), the tabs 74 and 136 may include fixed or non-fixed insertion relative to one another and the dovetails 124. In addition, similar to the previous embodiments, as a result, a plurality of fibers (not shown) forming the forward radial wall 62 and a plurality of fibers (not shown) forming the aft radial wall 64 are oriented at substantially right angles to a plurality of fibers (not shown) forming the flowpath cap 68. In this particular embodiment, the forward radial wall 62, the aft radial wall 64 and the flowpath cap 68 are not connected by fibers as none of the fibers bridge the interlocking mechanical joint 130. Thus a crack propagating along the joint plane would not be bridged by the fibers.

Figure 16:
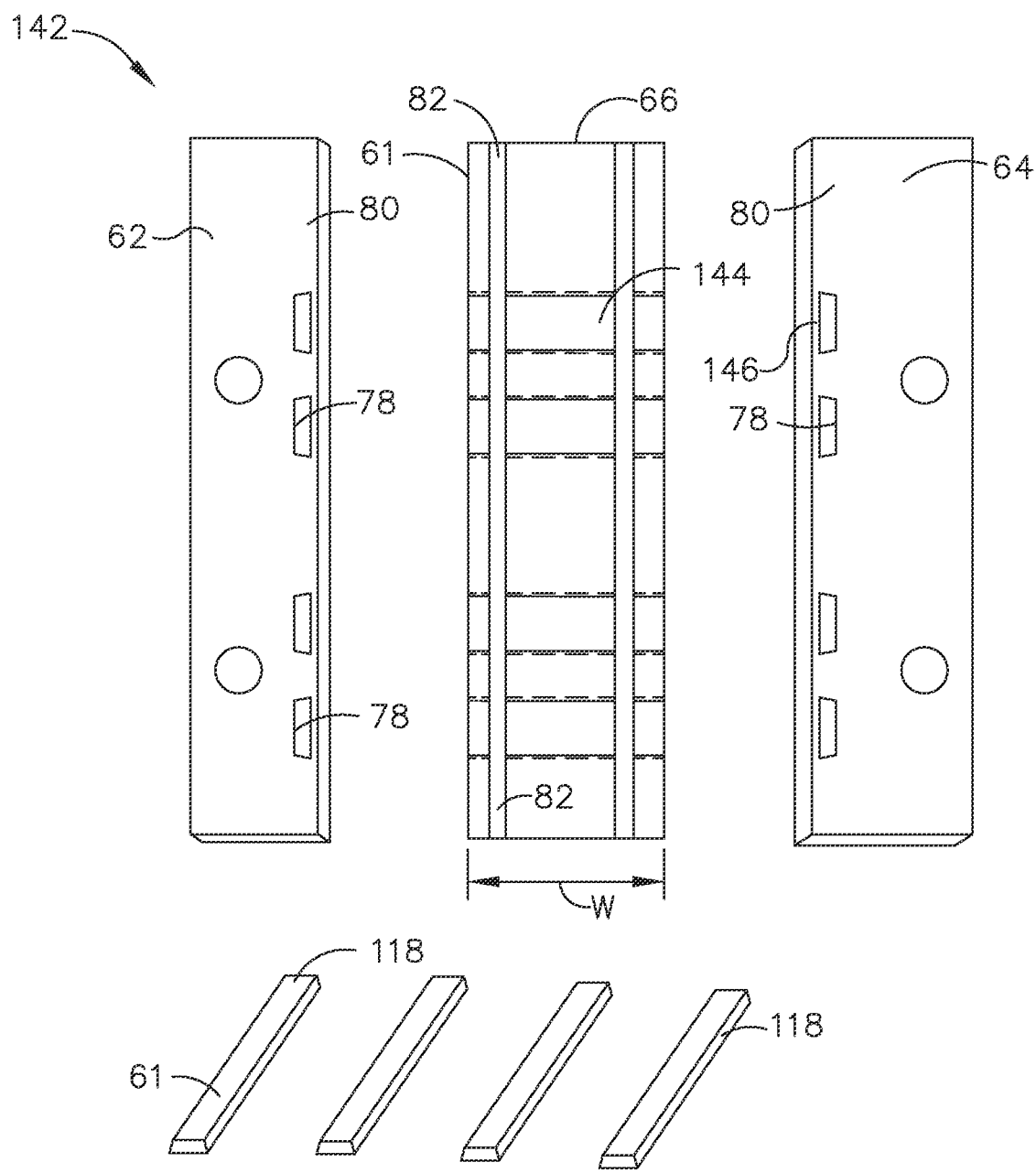
FIG. 16 illustrates another embodiment of a mechanical interlocking mechanical joint in a partially unjoined state for joining a plurality of subcomponents of a shroud segment, in accordance with one or more embodiments shown or described herein.
Figure 17:
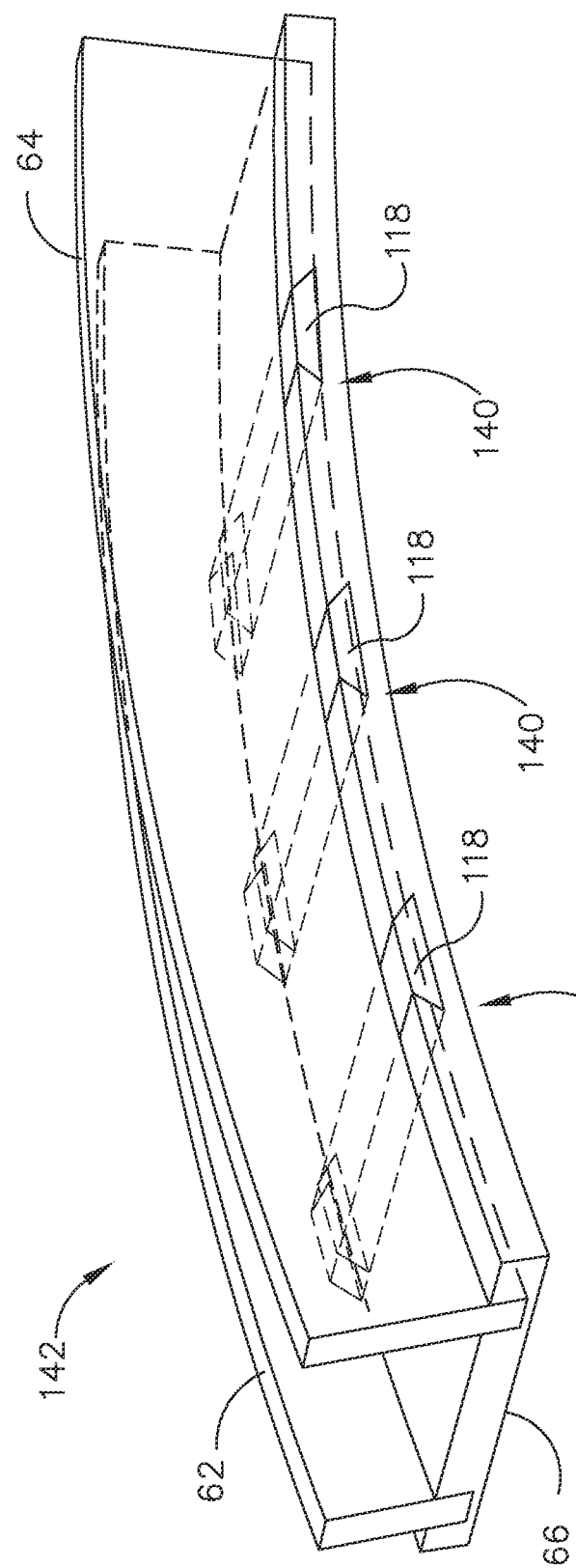
FIG. 17 illustrates the plurality of subcomponents of the shroud segment of FIG. 16 in a joined state, in accordance with one or more embodiments shown or described herein.
Figure 18:
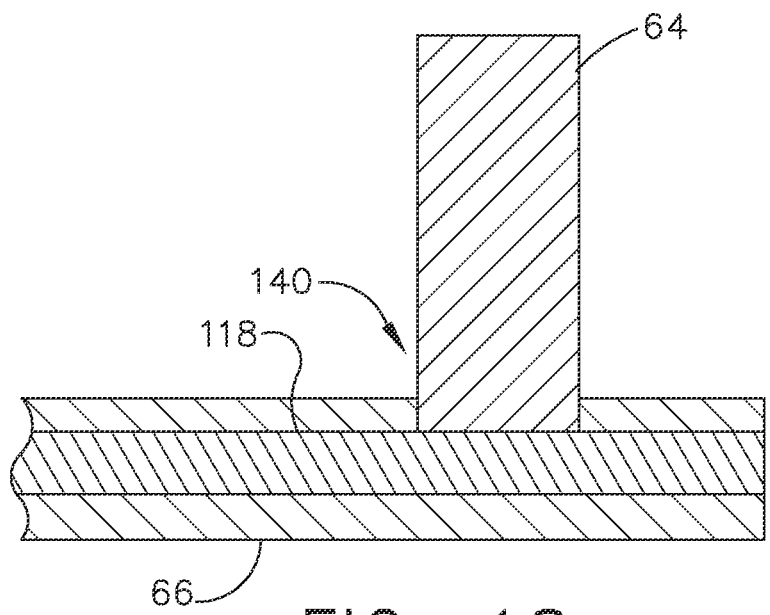
FIG. 18 illustrates the plurality of subcomponents of the shroud segment of FIG. 16 in a joined state, in accordance with one or more embodiments shown or described herein.
Figure 19:
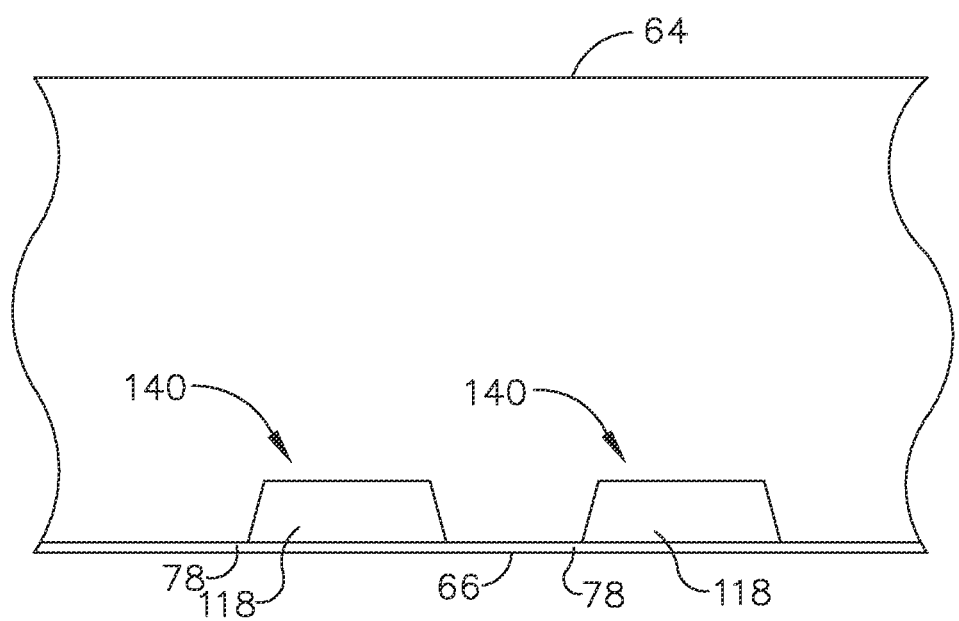
FIG. 19 illustrates the plurality of subcomponents of the shroud segment of FIG. 16 in a joined state, in accordance with one or more embodiments shown or described herein.

Referring now to FIG. 16-19, illustrated is another embodiment of a shroud segment 142 that forms a portion of a shroud component, such as shroud 36 of FIG. 1, including an interlocking mechanical joint 140. Again, it should be understood that like elements are provided with like numbers throughout the embodiments disclosed herein. FIG. 16 illustrates in an unjoined state, a forward radial wall 62, an aft radial wall 64, a flowpath 66 and an interlocking subcomponent 61, in the form of a plurality of interlocking pins 118, according to the present embodiment. FIGS. 17-19 illustrate the components in a joined state forming an interlocking mechanical joint 140. As best illustrated in FIG. 17, the aft radial wall 64, the forward radial wall 62, the flowpath 66 and the interlocking pins 118 are joined at the interlocking mechanical joint 140. In this particular embodiment, in addition to slots 82, the flowpath 66 includes a plurality of slots 144 formed therein and extending a width "W" of the flowpath 66 and more particularly the shroud segment 142. Subsequent to the disposing of each of the forward radial wall 62 and the aft radial wall 64 within a respective slot 82 in the flowpath 66, the interlocking pins 118 are disposed within the plurality of slots 118 and protruding therethrough a plurality of openings 78 formed therein and along a longitudinally extending lower edge 80 of each of the forward radial wall 62 and the aft radial wall 64. In the embodiment of FIGS. 16 and 17 the openings 78 in each of the forward radial wall 62 and the aft radial wall 64 are positioned proximate the longitudinally extending lower edges 80 so that a ligament 146 is formed on the forward radial wall 62 or aft radial wall 64 beneath each of the openings 78. In the embodiments of FIGS. 18 and 19, the openings 78 in each of the forward radial wall 62 and the aft radial wall 64 are positioned proximate the longitudinally extending lower edges 80 so there is no ligament formed on the forward radial wall 62 or aft radial wall 64 beneath the openings 78. The interlocking pins 118 are configured to cooperatively engage with the forward radial wall 62, the aft radial wall 64 and the flowpath 66 to form an interlocking mechanical joint 140. In each embodiment, the plurality of slots 118 and openings 78 are configured with close tolerance to a respective interlocking pin 118.

In the illustrated embodiments, each of the interlocking pins 118 is configured having a substantially trapezoidal shape whereby an aspect ratio of the trapezoid provides greater shear load carrying capability than a simple round pin. In an alternate embodiment, the interlocking pins may have any geometric shape. One of the plurality of interlocking pins 118 is disposed within each of the slots 144 to engage the forward radial wall 62 and aft radial wall 64 in a manner so as to form the interlocking mechanical joint 140. Similar to the previous embodiments including the tabs 74 (FIGS. 2-8), the interlocking pins 118 may include fixed or non-fixed insertion therein the slots 144. In addition, and as best illustrated in FIGS. 18 and 19, similar to the previous embodiments, as a result, a plurality of fibers (similar to fibers 65 previously described with regard to FIG. 5) forming the forward radial wall 62 (FIG. 17) and the aft radial wall 64 are oriented at substantially right angles to a plurality of fibers forming each of the interlocking pins 118. In this particular embodiment, the forward radial wall 62, the aft radial wall 64 and the interlocking pins 118 are not connected by fibers as none of the fibers bridge the interlocking mechanical joint 140.

Figure 20:
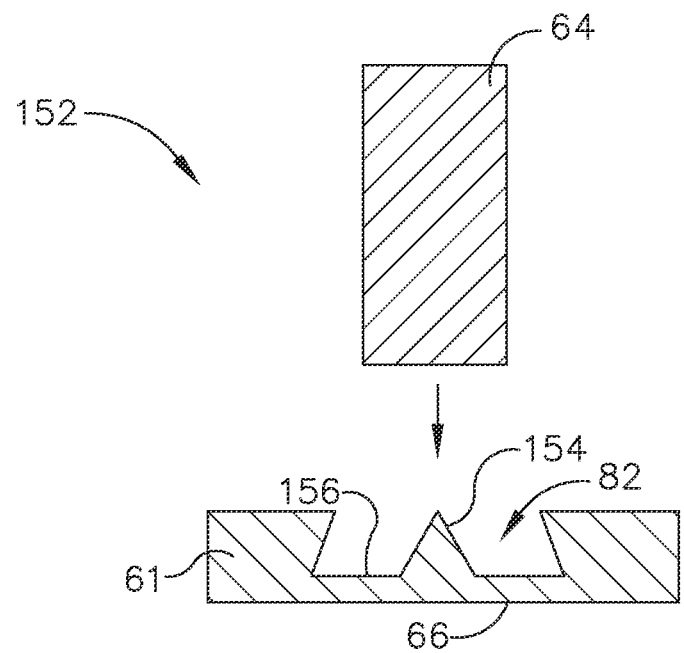
FIG. 20 illustrates another embodiment of a mechanical interlocking mechanical joint in a partially unjoined state for joining a plurality of subcomponents of a shroud segment, in accordance with one or more embodiments shown or described herein.
Figure 21:
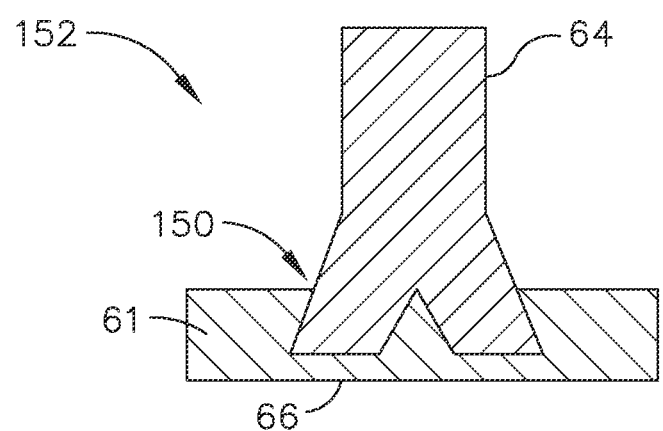
FIG. 21 illustrates the plurality of subcomponents of the shroud segment of FIG. 20 in a joined state, in accordance with one or more embodiments shown or described herein.

Referring now to FIGS. 20 and 21, illustrated in an unjoined schematic view, and a joined schematic view, respectively, is a portion of a shroud segment 152 that forms a portion of a shroud component, such as shroud 36 of FIG. 1. As in the previous embodiment, the shroud segment 152 is comprised of a forward radial wall (not shown), an aft radial wall 64 and an interlocking subcomponent 61 having defined therein at least one interlocking feature. In this particular embodiment the interlocking subcomponent is a flowpath 66 having defined therein a plurality of slots 82 having an obstruction 154 extending in an upwardly manner from an interior surface 156 of each of the slots 82, and extending a longitudinal length of the respective slot 82. During assembly, each of the forward radial wall 62 and the aft radial wall 64 cooperatively engage with a respective slot 82 and obstruction 154 of the flowpath 66 and form an interlocking mechanical joint 150.

Similar to the previous embodiments, the forward radial wall 62 and the aft radial wall 64 may include fixed or non-fixed insertion therein a respective slot 82. In addition, and as best illustrated in FIG. 21, similar to the previous embodiments, as a result, a plurality of fibers (similar to fibers 65 previously described with regard to FIG. 5) forming the forward radial wall 62 (not shown) and the aft radial wall 64 are oriented at substantially right angles to a plurality of fibers forming the flowpath 66. In this particular embodiment, the forward radial wall 62, the aft radial wall 64 and the flowpath 66 are not connected by fibers as none of the fibers bridge the interlocking mechanical joint 150.

Referring now to FIGS. 22 and 23, illustrated are additional embodiments of a shroud segment including at least one interlocking mechanical joint, referenced 160. More particularly, illustrated in FIGS. 22 and 23 are shroud segment 162, 164, respectively, generally similar to shroud segment 60 of FIG. 2, except in the embodiments of FIGS. 22 and 23, the shroud segment 162, 164 is configured as a box shroud, in contrast to the open shroud embodiments previously described. Referring more specifically to FIG.

22, illustrated in an end view is the shroud segment 162 including a plate-like structure 166 spanning between the forward radial wall 62 and the aft radial wall 64 to define the box shroud segment 162. In an embodiment the plate-like structure 166 provides a means for retaining the shroud segment 162 relative to a turbine structure. In the embodiment of FIG. 22, the plate-like structure is a separately formed structure from the forward radial wall 62 and the aft radial wall 64 and may include an interlocking mechanical joint 168, and more specifically, an interlocking subcomponent 61, such as any of those embodiments previously described, coupling the plate-like structure 162 to the forward radial wall 62 and the aft radial wall 64. As previously indicated the inclusion of the forward overhang 70 and the aft overhang 72 are optional.

In contrast, in the embodiment of FIG. 23, a plate-like structure 164 spanning between the forward radial wall 62 and the aft radial wall 64 is integrally formed therewith the forward radial wall 62 and the aft radial wall 64 to define the box shroud segment 164. Similar to the embodiment of FIG. 22, the plate-like structure 166 provides a means for retaining the shroud segment 164 relative to a turbine structure.

Figure 24:
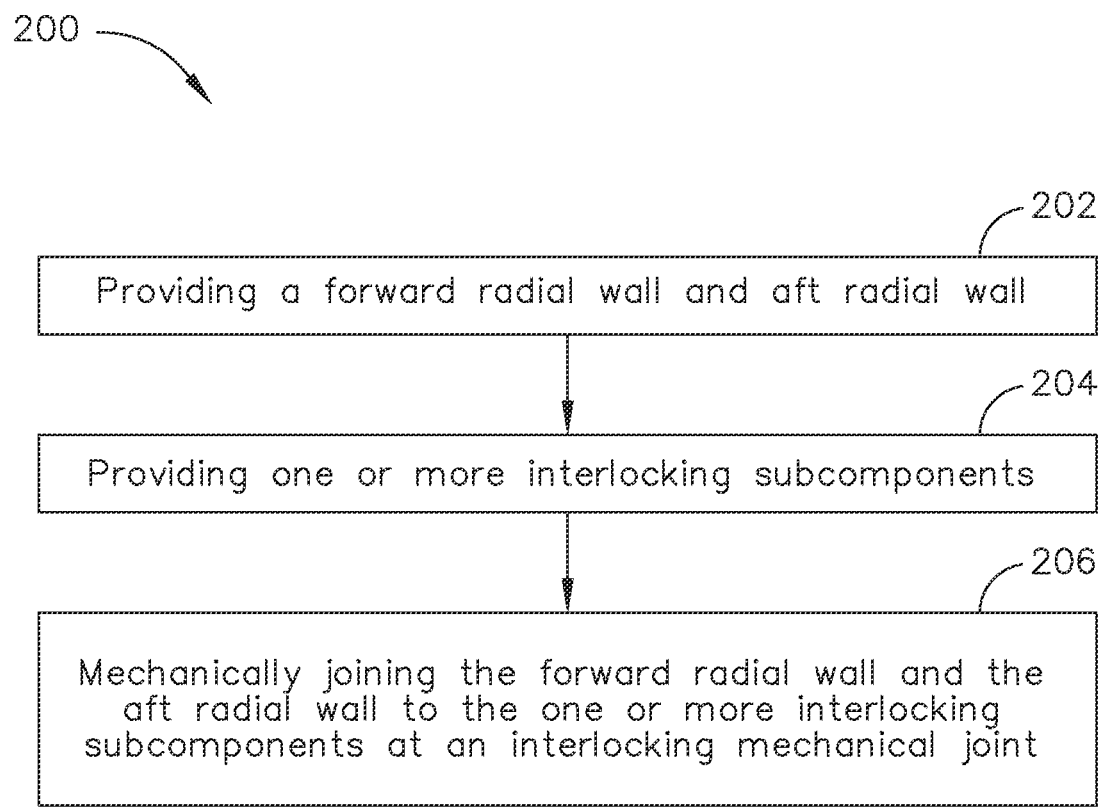
FIG. 24 is a flowchart illustrating the steps in a manufacturing method, in accordance with one or more embodiments shown or described herein.

FIG. 24 is a flowchart of a method 200 of forming a ceramic matrix composite (CMC) shroud segment, in accordance with an embodiment disclosed herein. As shown in FIG. 22, the method 200 comprises providing a forward radial wall and an aft radial wall comprised of a ceramic matrix composite (CMC) including reinforcing fibers embedded in a matrix, in a step 202. As previously described, the plurality of reinforcing fibers are oriented substantially along a length of each of the forward radial wall and the aft radial wall.

Next, the method 200 comprises providing at least one interlocking subcomponent, including an interlocking feature, in a step 204. In an embodiment, the at least one interlocking subcomponent includes a flowpath, a flowpath cap, a plurality of interlocking pins, as previously described. The at least one interlocking subcomponent is comprised of a ceramic matrix composite (CMC) including reinforcing fibers embedded in a matrix. As previously described, the plurality of reinforcing fibers are oriented along a length of the flowpath or flowpath cap.

The forward radial wall and the aft radial wall are next mechanically joined to the at least one interlocking subcomponent at an interlocking mechanical joint, in a step 206, to form the shroud segment. The at least one interlocking subcomponent may be comprised according to any of the previously described embodiments, and may include one or more of interlocking tabs, indents, interlocking CMC pins, or the like. The forward radial wall and the aft radial wall are joined to the at least one interlocking subcomponent in a manner to orient the reinforcing fibers of the forward radial wall and the aft radial wall, substantially orthogonal to the reinforcing fibers of one of the at least one interlocking subcomponent. The interlocking mechanical joint is formed during a CMC manufacture process in one of an autoclave (AC) state, a burn out (BO) state, or melt infiltration (MI) state. The interlocking mechanical joints, there may not be direct bonding of the subcomponents together, or the subcomponents may be bonded by silicon, silicon carbide, a combination thereof, or other suitable material. The bonding material may be deposited as a matrix precursor material that is subsequently densified by MI, CVI, or PIP. Alternatively, the bonding material may be produced by MI, CVI, or PIP without the use of matrix precursor in the joint. As previously noted, the joints described herein may be formed at any appropriate stage in CMC processing. That is, the subcomponents may be comprised of green prepreg, laminated preforms, pyrolyzed preforms, fully densified preforms, or combinations thereof.

Accordingly, described is the use of mechanical joints to join multiple subcomponents, and more specifically the use of mechanical interlocking mechanical joints, including one or more tabs, indents or reinforcing CMC pins, wherein the ceramic fibers that comprise the subcomponents or the interlocking means would need to be broken in order to separate the joint in an expected loading direction. While some existing interlocking mechanical joints behave in this manner, others do not and could fail by shearing the interlocking feature in the interlaminar direction. The interlocking mechanical joints as described herein provide for reinforcement of the subcomponents that make up the joint, without reinforcing the joint itself. This approach can greatly simplify the manufacturing process and prevent the property debits that can occur in a direction orthogonal to the reinforcement. The interlocking mechanical joining of the subcomponents as described herein can be done in the layed up state prior to lamination, in the autoclave (AC), burn out (BO), or melt infiltration (MI) state or combinations thereof of the CMC manufacture process. For joints made in the MI state, the joint may be left "unglued". These joints may also be easier to repair. In an embodiment, simple shapes, such as flat panels, can be green machined (in autoclaved state) and assembled using woodworking type interlocking mechanical joints as described herein. In an embodiment, a CMC matrix precursor slurry (or variants thereof) may be used to bond or glue the CMC subcomponents together. Final densification and bonding occurs in the MI state.

While the invention has been described in terms of one or more particular embodiments, it is apparent that other forms could be adopted by one skilled in the art. It is understood that in the method shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shroud segment comprising:
   a forward radial wall comprising a ceramic matrix composite including reinforcing fibers embedded in a matrix;
   an aft radial wall comprising a ceramic matrix composite including reinforcing fibers embedded in a matrix;
   at least one interlocking subcomponent comprising a ceramic matrix composite including reinforcing fibers embedded in a matrix, wherein the at least one interlocking subcomponent comprises a flowpath comprising one or more slots extending between axially extending opposed edges of the flowpath; and an interlocking mechanical joint joining each of the forward radial wall and the aft radial wall to the at least one interlocking subcomponent to form the shroud segment.

2. The shroud segment of claim 1, wherein the at least one interlocking subcomponent further comprises a flowpath cap comprising a plurality of tabs cooperatively engaged with a plurality of openings formed in each of the forward radial wall and the aft radial wall.

3. The shroud segment of claim 1, wherein the at least one interlocking subcomponent further comprises a forward overhang and an aft overhang each comprising a plurality of tabs cooperatively engaged with a plurality of openings formed in each of the forward radial wall and the aft radial wall.

4. The shroud segment of claim 1, wherein the at least one interlocking subcomponent further comprises a flowpath cap comprising a plurality of tabs cooperatively engaged with a first plurality of openings formed in each of the forward radial wall and the aft radial wall and wherein the at least one interlocking subcomponent further comprises a forward overhang and an aft overhang comprising a plurality of tabs cooperatively engaged with a second plurality of openings formed in each of the forward radial wall and the aft radial wall.

5. The shroud segment of claim 1, wherein the at least one interlocking subcomponent further comprises an interlocking ceramic matrix composite pin.

6. The shroud segment of claim 5, wherein each of the forward radial wall and the aft radial wall comprise a cooperatively aligned slot, and wherein the interlocking ceramic matrix composite pin disposed therein each of the slots defining the interlocking mechanical joint.

7. The shroud segment of claim 1, wherein the at least one interlocking subcomponent comprises a plurality of slots extending longitudinally a length of the flowpath, and wherein each of the plurality of slots includes an obstruction extending from a surface of the slot and configured to cooperatively engage with a respective one of the forward radial wall and the aft radial wall.

8. The shroud segment of claim 1, wherein at least one or more of the forward radial wall, the aft radial wall, and the at least one interlocking subcomponent are bonded to at least another one of the forward radial wall, the aft radial wall, and the at least one interlocking subcomponent with a bonding material.

9. The shroud segment of claim 8, wherein the bonding material comprises a matrix precursor material.

10. A shroud segment for a gas turbine comprising:
a forward radial wall comprising a ceramic matrix composite including a plurality of reinforcing fibers embedded in a matrix;
an aft radial wall comprising a ceramic matrix composite including a plurality of reinforcing fibers embedded in a matrix;
at least one interlocking subcomponent comprising a ceramic matrix composite including reinforcing fibers embedded in a matrix, wherein the at least one interlocking subcomponent comprises a flowpath comprising one or more slots extending between axially extending opposed edges of the flowpath; and
an interlocking mechanical joint joining each of the forward radial wall and the aft radial wall to the at least one interlocking subcomponent to form the shroud segment,
wherein at least one or more of the forward radial wall, the aft radial wall, and the at least one interlocking subcomponent are bonded to at least another one of the forward radial wall, the aft radial wall, and the at least one interlocking subcomponent.

11. The shroud segment of claim 10, wherein the at least one interlocking subcomponent further comprises a flowpath cap comprising a plurality of tabs cooperatively engaged with a plurality of openings formed in each of the forward radial wall and the aft radial wall.

12. The shroud segment of claim 10, wherein the at least one interlocking subcomponent further comprises a flowpath cap comprising a plurality of tabs cooperatively engaged with a first plurality of openings formed in each of the forward radial wall and the aft radial wall and a forward overhang and an aft overhang comprising a plurality of tabs cooperatively engaged with a second plurality of openings formed in each of the forward radial wall and the aft radial wall.

13. The shroud segment of claim 10, wherein the at least one interlocking subcomponent further comprises an interlocking ceramic matrix composite pin.

14. The shroud segment of claim 13, wherein each of the forward radial wall and the aft radial wall comprise a cooperatively aligned slot, the interlocking CMC pin disposed therein each of the slots defining the interlocking mechanical joint.

15. The shroud segment of claim 10, wherein the at least one interlocking subcomponent comprises a plurality of slots extending longitudinally a length of the flowpath, and wherein each of the plurality of slots includes an obstruction extending from a surface of the slot and configured to cooperatively engage with a respective one of the forward radial wall and the aft radial wall.

16. A method of forming a ceramic matrix composite shroud segment comprising:
providing a forward radial wall comprising a ceramic matrix composite including reinforcing fibers embedded in a matrix;
providing an aft radial wall comprising a ceramic matrix composite including reinforcing fibers embedded in a matrix;
providing at least one interlocking subcomponent comprising a ceramic matrix composite (CMC) including reinforcing fibers embedded in a matrix, wherein the at least one interlocking subcomponent comprises a flowpath comprising one or more slots extending between axially extending opposed edges of the flowpath; and
mechanically joining each of the forward radial wall and the aft radial wall to the at least one interlocking subcomponent at an interlocking mechanical joint to form the ceramic matrix composite shroud segment.

* * * * *